(12) United States Patent
Jadhav et al.

(10) Patent No.: US 12,504,237 B2
(45) Date of Patent: Dec. 23, 2025

(54) MULTI-TIERED REGENERATOR

(71) Applicant: Thermolift, Inc., Novi, MI (US)

(72) Inventors: Akshay Jadhav, Ann Arbor, MI (US); Haocheng Yang, Novi, MI (US); Haoxiang Yang, Novi, MI (US); Kevin Mumpower, Livonia, MI (US); Peng Shi, Canton, MI (US)

(73) Assignee: THERMOLIFT, INC., Novi, MI (US)

( * ) Notice: Subject to any disclaimer, the term of this patent is extended or adjusted under 35 U.S.C. 154(b) by 445 days.

(21) Appl. No.: 17/938,177

(22) Filed: Oct. 5, 2022

(65) Prior Publication Data

US 2024/0118037 A1    Apr. 11, 2024

(51) Int. Cl.
| | | |
|---|---|---|
| F28D 17/02 | (2006.01) | |
| F25B 9/14 | (2006.01) | |
| F28D 20/00 | (2006.01) | |

(52) U.S. Cl.
CPC ............. *F28D 17/02* (2013.01); *F25B 9/14* (2013.01); *F28D 20/0056* (2013.01)

(58) Field of Classification Search
CPC ........ F02G 1/57; F25B 9/14; F25B 2309/003; F28D 15/02; F28D 17/02; F28D 19/04; F28D 19/041; F28D 20/0056
See application file for complete search history.

(56) References Cited

U.S. PATENT DOCUMENTS

| | | | | |
|---|---|---|---|---|
| 4,231,423 A | * | 11/1980 | Haslett ................ | F28D 15/0233 29/890.032 |
| 4,482,004 A | * | 11/1984 | Grover ................ | F28D 15/0275 165/47 |
| 4,688,399 A | * | 8/1987 | Reimann ............. | F28D 15/0266 62/89 |
| 4,842,053 A | * | 6/1989 | Yatsuhashi ............. | F28D 7/085 165/70 |
| 5,182,921 A | * | 2/1993 | Yan ....................... | F24F 5/0046 95/193 |

(Continued)

OTHER PUBLICATIONS

Anders S. Nielsen; "Enhancing the effectiveness of Stirling engine regenerators," Thesis Examination Information for Master of Applied Science in Mechanical Engineering University of Ontario Institute of Technology, Apr. 2019.

(Continued)

*Primary Examiner* — Eric S Ruppert
*Assistant Examiner* — Hans R Weiland
(74) *Attorney, Agent, or Firm* — Perilla Knox & Hildebrandt LLP; Jason M. Perilla

(57) ABSTRACT

A multi-layered regenerator for adjusting temperature of gas or fluid flowing therethrough is provided. The regenerator includes a cover portion and a base portion, each of the cover portion and the base portion comprising a plurality of apertures permitting gas or fluid to flow from a top to a bottom of the multi-layered regenerator, and from the bottom to the top of the multi-layered regenerator. At least one of the cover portion and the base portion include thermal layers stacked vertically with respect to one another, each of the plurality of thermal layers having a predetermined porosity. At least a first one of the plurality of thermal layers is formed of a thermally conductive material and a second one of the plurality of thermal layers is formed of a thermally insulative material.

20 Claims, 15 Drawing Sheets

(56) References Cited

U.S. PATENT DOCUMENTS

| | | | | |
|---|---|---|---|---|
| 5,297,398 | A | * | 3/1994 | Meckler .............. B01D 53/261 62/271 |
| 5,343,632 | A | * | 9/1994 | Dinh .................... F26B 21/086 34/507 |
| 5,817,167 | A | * | 10/1998 | DesChamps .......... B01D 53/06 95/114 |
| 6,442,951 | B1 | * | 9/2002 | Maeda .................... F28D 15/02 62/93 |
| 2009/0151920 | A1 | * | 6/2009 | Polcyn ................... F28D 17/02 165/181 |

OTHER PUBLICATIONS

Gedeon et al; "Oscillating-Flow Regenerator Test Rig: Hardware and Theory With Derived Correlations for Screens and Felts" NASA Contractor Report 198442, Feb. 1996, pp. 1-66.

Ibrahim et al.; "Microfabrication of a Segmented-Involute-Foil Regenerator, Testing in a Sunpower Stirling Convertor, and Supporting Modeling and Analysis" American Institute of Aeronautics and Astronautics, 2008, pp. 1-27.

Kang et al.; "Comprehensive Study of Heat Transfer and Pressure Drop in Regenerator and Optimization of Solid- state Caloric Cooling Cycles Using Realistic Hydraulic Diameter of Regenerator" 18th International Refrigeration and Air Conditioning Conference at Purdue, May 24-28, 2021 pp. 1-10.

Moynihan et al.; "Free-piston Stirling engine experimental program: Part 2—An Evaluation of Loss Mechanisms" ANL-CT-83-7 Part 2, Jun. 1983.

Nielsen et al.; "Stirling engine regenerators: How to attain over 95% regenerator effectiveness with sub-regenerators and thermal mass ratios," Applied Energy 253 (2019) 113557, pp. 1-12.

Niu et al.; "Jet Penetration Into a Stirling Engine Regenerator Matrix With Various Regenerator-to-Cooler Spacings" 1st International Energy Conversion Engineering Conference Aug. 17-21, 2003, pp. 1-8, Portsmouth, Virginia.

Park et al.; "Development and Experimental Investigation of Stirling-type Pulse Tube Refrigerator (PTR) below 20 K; Cold Compressor and Colder Expander" 2017, pp. 1-44.

Roach et al.; "Analysis of Pressure Drop and Heat Transfer Data from the Reversing Flow Test Facility" May 1989, ANL/MCT-88-2.

Sun et al.; "Jet Penetration into a Scaled Microfabricated Stirling Cycle Regenerator" American Institute of Aeronautics and Astronautics, 2008, pp. 1-17.

Xiao et al.; "Characteristics of steady and oscillating flows through regenerator" International Journal of Heat and Mass Transfer 108 (2017) 309-321.

Yamashita et al.; "Effect of Entrance and Exit Areas on the Pressure Drop and Velocity Distribution in Regenerator Matrix" JSME International Journal, Series B, vol. 42, No. 3, 1999, pp. 498-505.

Yanaga et al.; "Robust foil regenerator flow loss and heat transfer tests under oscillating flow condition," 2020, pp. 1-35, https://www.elsevier.com/open-access/userlicense/1.0/.

* cited by examiner

MULTI-TIERED REGENERATOR

BACKGROUND

A regenerative heat exchanger, or regenerator, is relied upon to store thermal energy, typically provided from one fluid, before it is exchanged into another fluid. In some cases, the fluid used to provide or transfer thermal energy to the regenerator is the same fluid that receives the thermal energy from the same regenerator. Many different types of heat exchanger and regenerator configurations that have been used over the years. Many of these designs have been constrained by material limitations.

TECHNICAL FIELD

The present disclosure relates to heat exchangers and, more specifically, to heat exchangers for use in heat engine and heat pump applications.

BRIEF SUMMARY

Various embodiments are disclosed for a regenerator for adjusting temperature of gas flowing therethrough. In a first aspect, a multi-layered regenerator is described that includes a cover portion and a base portion configured to detachably attach to one another. Each of the cover portion and the base portion include a plurality of apertures permitting a working gas or fluid to flow from a top to a bottom of the multi-layered regenerator, and from the bottom to the top of the multi-layered regenerator. At least one of the cover portion and the base portion includes a plurality of thermal layers stacked vertically with respect to one another, each of the plurality of thermal layers having a predetermined porosity.

At least a first one of the plurality of thermal layers is formed of a thermally conductive material and a second one of the plurality of thermal layers is formed of a thermally insulative material. Further, a third one of the plurality of thermal layers is formed of a thermally conductive material, a fourth one of the plurality of thermal layers is formed of a thermally insulative material, and a fifth one of the plurality of thermal layers is formed of a thermally conductive material. The thermally conductive material of the first one of the plurality of thermal layers is configured to reduce a temperature of gas entering the top of the multi-layered regenerator from a top entrance temperature to a first temperature less than the top entrance temperature, the thermically conductive material of the third one of the plurality of thermal layers is configured to reduce the temperature of the gas to a second temperature less than the first temperature, and the thermically conductive material of the fifth one of the plurality of thermal layers is configured to reduce the temperature of the gas to a third temperature less than the second temperature.

The thermically conductive material of the fifth one of the plurality of thermal layers, the thermically conductive material of the third one of the plurality of thermal layers, and the thermically conductive material of the first one of the plurality of thermal layers may have heat stored therein. The thermically conductive material of the fifth one of the plurality of thermal layers is configured to increase a temperature of gas entering the bottom of the multi-layered regenerator from a bottom entrance temperature to a first temperature greater than the bottom entrance temperature. The thermically conductive material of the third one of the plurality of thermal layers is configured to increase the temperature of the gas to a second temperature less greater than the first temperature. The thermically conductive material of the first one of the plurality of thermal layers is configured to increase the temperature of the gas to a third temperature greater than the second temperature.

A fourth one of the plurality of thermal layers is formed of a thermally insulative material, and the second one of the plurality of thermal layers is positioned between the first one and the third one of the plurality of layers. The cover portion includes a top lid and an inner neck positioned within a central aperture of the top lid, the plurality of apertures of the cover portion being a plurality of top-side apertures on the top lid, the base portion includes an outer surface, an inner ridge, and a bottom lid, the plurality of apertures of the base portion being a plurality of bottom-side apertures on the bottom lid, and the cover portion is nested within the base portion and is positioned on the inner ridge such that a top surface of the top lid is substantially flush with a top of the outer surface of the base portion.

At least one of the plurality of thermal layers is formed of a conductive mesh material, where the predetermined porosity of the conductive mesh material is between 10% and 90%. For example, the first one of the plurality of thermal layers may be formed of stainless steel, the second one of the plurality of thermal layers may be formed of fiberglass, the third one of the plurality of thermal layers may be formed of copper, the fourth one of the plurality of thermal layers may be fiberglass, and the fifth one of the plurality of thermal layers may be stainless steel.

In a second aspect, a method is described that includes providing the foregoing multi-layered regenerator for adjusting temperature of gas flowing therethrough. The method further includes cooling the working gas by directing the working gas through the multi-layered regenerator from the top to the bottom, and heating the working gas by directing the working gas through the multi-layered regenerator from the bottom to the top.

In a third aspect, a thermally communicating regenerator for adjusting temperature of gas flowing therethrough is described. The thermally communicating regenerator includes a housing having a first side configured to cool a working gas and a second side to heat a working gas as the working gas is directed in an annular direction, the second side being opposite that of the first side, a first thermal portion on the first side extending vertically from a bottom of the housing to a top of the housing, and a second thermal portion on the second side extending vertically from the bottom of the housing to the top of the housing. The first thermal portion and the second thermal portion are both formed of conductive material, where the first thermal portion is thermally coupled to the second thermal portion via a first thermal coupling member that transfers heat from the first thermal portion to the second thermal portion.

The thermally communicating regenerator further includes a third thermal portion on the first side extending vertically from the bottom of the housing to the top of the housing, and a fourth thermal portion on the second side extending vertically from the bottom of the housing to the top of the housing. The third thermal portion is thermally coupled to the fourth thermal portion via a second thermal coupling member that transfers heat from the third thermal portion to the fourth thermal portion.

In some aspects, the housing is an annular shaped housing, the multi-layered regenerator further includes a first insulator portion positioned between the first thermal portion and the third thermal portion on the first side, and a second insulator portion positioned between the second thermal portion and the fourth thermal portion on the second side, and the first insulator portion and the second insulator portion are both formed of an insulator material.

The thermally communicating regenerator may further include third, fifth, seventh, and ninth thermal sections, each extending vertically from the bottom of the housing to the top of the housing, on the first side of the regenerator, and fourth, sixth, eighth, and tenth thermal sections, each extending vertically from the bottom of the housing to the top of the housing, on the second side of the regenerator. The regenerator may further include a first inlet positioned on and thermally coupled to the first thermal section, a first outlet positioned on and thermally coupled to the ninth thermal section, a second inlet positioned on and thermally coupled to the tenth thermal section, and a second outlet positioned on and thermally coupled to the second thermal section. The inlets and the outlets may be unidirectional.

The thermally communicating regenerator is configured receive the working gas via the first inlet at an entrance temperature and dispel the working gas via the first outlet at an exit temperature less than the entrance temperature. Also, the regenerator is further configured receive additional working gas via the second inlet at an entrance temperature and dispel the working gas via the second outlet at an exit temperature greater than the entrance temperature. The first thermal coupling member and the second thermal coupling member may each be one of highly heat conductive material, such as a heat pipe and a copper rod. The first thermal section and the second thermal section are each formed of a conductive mesh material having a predetermined porosity.

In a fourth aspect, a method is described that includes providing the foregoing thermally communicating regenerator for adjusting temperature of gas flowing therethrough. The method further includes cooling a working gas by directing the working gas through the thermally communicating regenerator through the left side, and heating the working gas by directing the working gas through the right side.

In a fifth aspect, a thermally communicating regenerator for adjusting temperature of gas or fluid flowing therethrough in at least one of a unidirectional and bi-directional manner is described, including a housing having a first side configured to cool a working gas or fluid and a second side to heat a working gas or fluid as the working gas or fluid is directed in a vertical direction, the second side being opposite that of the first side, a first plurality of thermal portions stacked vertically on the first side extending from a bottom of the housing to a top of the housing; and a second plurality of thermal portions stacked vertically on the second side extending from the bottom of the housing to the top of the housing. The first thermal portion and the second thermal portion are both formed of conductive material, where the first thermal portion is thermally coupled to the second thermal portion via a first set of thermal coupling members that transfer heat from the first thermal portion to the second thermal portion.

In a sixth aspect, a method is described that includes providing the foregoing thermally communicating regenerator for adjusting temperature of gas flowing therethrough. The method further includes cooling a working gas by directing the working gas through the thermally communicating regenerator through the left side, and heating the working gas by directing the working gas through the right side.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, a regenerative heat exchanger, or regenerator, is relied upon to store thermal energy, typically provided from one fluid, before it is exchanged into another fluid. In some cases, the fluid used to provide or transfer thermal energy to the regenerator is the same fluid that receives the thermal energy from the same regenerator. Many different types of heat exchanger and regenerator configurations have been used over the years, and the performance of regenerators has been limited to some extent by the materials used in their design. However, with the advent of new materials having various heating and cooling characteristics, heat exchangers and regenerators that might have not been conceived of previously can now be fabricated. Some regenerators are formed of a uniform wire mesh material. As a gas is forced through the wire mesh material, heat is removed from the gas, thereby cooling the gas.

In the context outlined above, new types of multi-layered regenerators are described. An example regenerator includes a cover portion and a base portion, where each of the cover portion and the base portion include apertures permitting gas to flow from a top to a bottom of the multi-layered regenerator, and from the bottom to the top of the multi-layered regenerator. The cover portion and the base portion include thermal layers stacked vertically with respect to one another, and each of the thermal layers has a predetermined porosity in one example. At least a first one of the thermal layers is formed of a thermally conductive material and a second one of the thermal layers is formed of a thermally insulative material.

Figure 1:
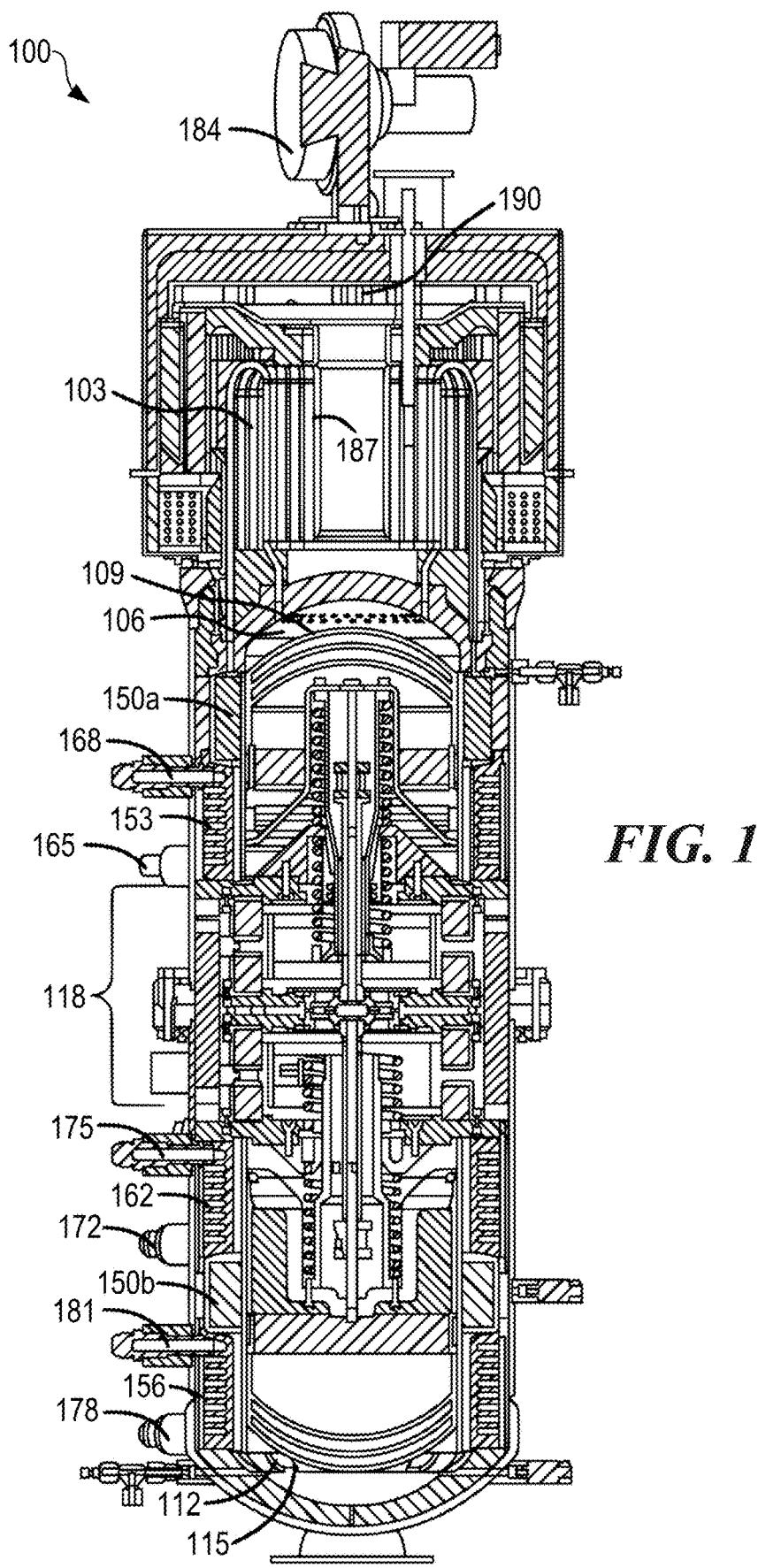
FIG. 1 is an example of a compression-expansion heat pump including multiple regenerators in accordance with various embodiments of the present disclosure.

In some implementations, the regenerators described herein may be one or more regenerators of a thermodynamic apparatus, such as a compression-expansion heat pump 100, as will be described. Turning now to FIG. 1, a non-limiting example of a thermodynamic apparatus in the form of the compression-expansion heat pump 100 ("heat pump 100" for short) is shown according to various embodiments. In some implementations, the heat pump 100 may act as a high-efficiency, non-toxic refrigerant heating, ventilation, and air conditioning (HVAC) device for residential, industrial, commercial, and like applications. As such, in some embodiments, the compression-expansion heat pump 100 may offer a hot-water and refrigeration system in a single device which assists in carbon reduction, cutting carbon dioxide emissions, and reducing energy costs across residential, commercial, and industrial applications.

In various embodiments, the heat pump 100 may include a hot heat exchanger 103, a cylinder 106 in which a hot displacer 109 reciprocates, and a cylinder 112 in which a cold displacer 115 reciprocates. A mechatronics section 118 of the heat pump 100 may include mechatronic actuators that are coupled to hot displacer 109 and cold displacers 115, respectively, that drive the displacers 109, 115 between ends of travel. Differences in gas pressure due to temperature and the like may drive the displacers 109, 115 forcing gas upwards towards a top of the heat pump 100 or towards a bottom of the heat pump 100, as will be described. A low molecular weight gas, such as hydrogen, helium, or other gas, may be contained within cylinders 106, 112 and inside tubes of the hot heat exchanger 103. The heat pump 100 may further include a hot chamber delimited by a dome, cylinder walls, and a top surface of displacer 109. While described herein with respect to a combustion gas with a blower and mesh burner, it is understood that other forms of heat input may also drive a thermodynamic cycle such as, but not limited to, direct solar heating, electric heat input, renewable natural gas (RNG), biomass, and so forth.

The heat pump 100 further includes a warm-hot chamber that is not visible in FIG. 1 due to the hot displacer 109 being shown in FIG. 1 in a lower position. However, the warm-hot chamber may be located between the mechatronics section 118 and the hot displacer 109. A cold chamber that may be positioned below cold displacer 115 is visible in FIG. 1 although a cold-warm chamber is not visible due to the hot displacer 109 being shown in its upper position.

When the hot displacer 109 and the cold displacer 115 reciprocate, a working gas moves among the cold chamber, the hot chamber, the warm-hot chamber, and the warm-cold chamber. The working gas accesses the various chambers by traveling through regenerators and/or heat exchangers located in an annular space located outside of the cylinder 106 and the cylinder 112. For example, when the hot displacer 109 moves upward toward hot heat exchanger 103, the working gas flows from tubes of the hot heat exchanger 103 into a first regenerator 150a, from the first regenerator 150a into a warm-hot heat exchanger 153, and from the warm-hot heat exchanger 153 into the warm-hot chamber. When the hot displacer 109 moves the other direction, flow is reversed compared to that described above. For the sake of convenience, the working gas or fluid will merely be referred to herein as a working gas, which is understood to encompass both gases and fluids.

With respect to movement of the cold displacer 115, working fluid moves between the volume within cylinder 112 below the cold displacer 115 (away from the mechatronics section 118) and a cold heat exchanger 156, between the cold heat exchanger 156 and a second regenerator 150b, between the second regenerator 150b and a warm-cold heat exchanger 162, and between the warm-cold heat exchanger 162 and the warm-cold chamber.

One of the fluids passing through heat exchangers 153, 156, and 162 is the working fluid. The other fluid in the present example may be a liquid coolant. With respect to the warm-hot heat exchanger 153, the coolant may access passageways of the warm-hot heat exchanger 153 through inlet 165 and exits through outlet 168. Similarly, passages of warm-cold heat exchanger 162 are coupled to an inlet 172 and an outlet 175, and passages of cold heat exchanger 156 are coupled to an inlet 178 and an outlet 181.

Air and fuel are provided to heat pump 100 via a blower 184. Premixed air and fuel may be routed through a heat exchanger for preheating by exhaust gases leaving heat pump 100. However, the air and fuel may be provided to a diffuser-combustor 187 through an inlet 190. The diffuser-combustor 187 may have an opening on the outer surface that prevents blow back of combustion into the interior of combustor 187. The diffuser-combustor 187 may act as a combustion holder with fuel oxidizing near an outer surface of diffuser-combustor 187. The diffuser-combustor 187 may absorb heat increasing its temperature and thereby radiating heat to the tubes of the hot heat exchanger 103. In various embodiments, the tubes are U-shaped with one side of the U being positioned closer to the diffuser-combustor 187.

In operation, heat is created at a top of the heat pump 100 to heat a gas, which is routed downwards to a bottom of the heat pump 100 where a temperature of the gas is reduced through various heat reduction techniques (e.g., regenerators 150, heat exchangers, and the like), thereby generating colder gas or the like at a bottom of the heat pump 100. First, burners are employed to heat helium, hydrogen, or other natural gas at or near a top of the heat pump 100 in tubes of the hot heat exchanger 103, for example. The heat is directed downwards through various regenerators 150, heat exchangers, and the like to reduce heat and temperature of the gas. As such, the heat pump 100 can produce hot and cold air in HVAC implementations and other desirable applications. Cold gas is then redirected upwards to be reheated, for instance, by directing the gas through opposing sides of the regenerators 150, heat exchangers, and the like. This process may repeat and otherwise continue to be performed during operation of the heat pump 100.

In various embodiments, the heat pump 100 may include a hot regenerator 150a and a cold regenerator 150b (collectively "regenerators 150"). However, the heat pump 100 is not limited to one or two regenerators 150, and it is understood that other numbers of regenerators 150 may be employed in the heat pump 100 or like system, such as one, two, three, four, five, six regenerators 150, and so forth. When a gas, such as helium, hydrogen, etc., is directed through the hot regenerator 150a, the gas is cooled down from an entrance temperature (e.g., 600° C.) to an exit temperature (e.g., 80° C.), where the exit temperature is less than the entrance temperature. The hot regenerator 150a does not output the heat to other components of the heat pump 100. Instead, the hot regenerator 150a stores the heat, as will be described.

As the gas is directed downwards to the bottom of the heat pump 100 shown in FIG. 1, the gas is directed through additional heat exchangers and the like, further reducing the temperature of the gas. Eventually, the gas is directed through the cold regenerator 150b, where the air is cooled down from an entrance temperature (e.g., 70° C.) to an exit temperature (e.g., less than or equal to 0° C.), where the exit temperature is again less than the entrance temperature. After the cooling stage is complete, the gas is then redirected upwards for heating. As the gas is redirected through the cold regenerator 150b and the hot regenerator 150a, the temperature of the gas will be increased using heat stored in the respective regenerators 150, as will be further described.

In traditional regenerative cycles, like Stirling engines or Vuilleumier heat pumps, a regenerator 150 has a simplistic and minimal design to allow working gas to pass from one direction (e.g., a top to bottom direction) to deposit heat and cool down as it moves downwards towards a bottom of the heat pump 100. Then, working gas coming from another direction (e.g., bottom to top direction) withdraws heat and increases in temperature as it moves upwards towards a top of the heat pump 100. The foregoing reversing flow pattern requires a reciprocating motion using, for example, displacers 109, 115.

Some conventional regenerators have been formed of a single material. As such, it has been difficult to design and provide a regenerator that reduces a temperature of gas from an entrance temperature to a desired exit temperature while accounting for size limitations of the regenerator and/or the heat pump in which the regenerator is employed. Additionally, it has been difficult to design and provide a regenerator that stores heat in such a manner that the stored heat can be employed to heat gas in an additional heat cycle, as described above. Additional issues with traditional regenerator designs include heat migration from the top to the bottom, which is not desirable for ideal thermodynamic performance. Accordingly, a layered design is described with insulated layers that prevent heat migration while allowing a working gas to deposit energy a specific design temp (e.g., 500° C. at a first layer, 400° C. at a second layer, etc.)

Accordingly, various embodiments are described for a regenerator 150 that may be employed in a heat pump 100 or like system that sufficiently reduces a temperature of gas from an entrance temperature to an exit temperature, while also sufficiently storing heat that can be reused. By storing and reusing heat, less energy is required to continue operation of the heat pump 100, reducing use of gas, water, and other resources, as may be appreciated.

Figure 2:
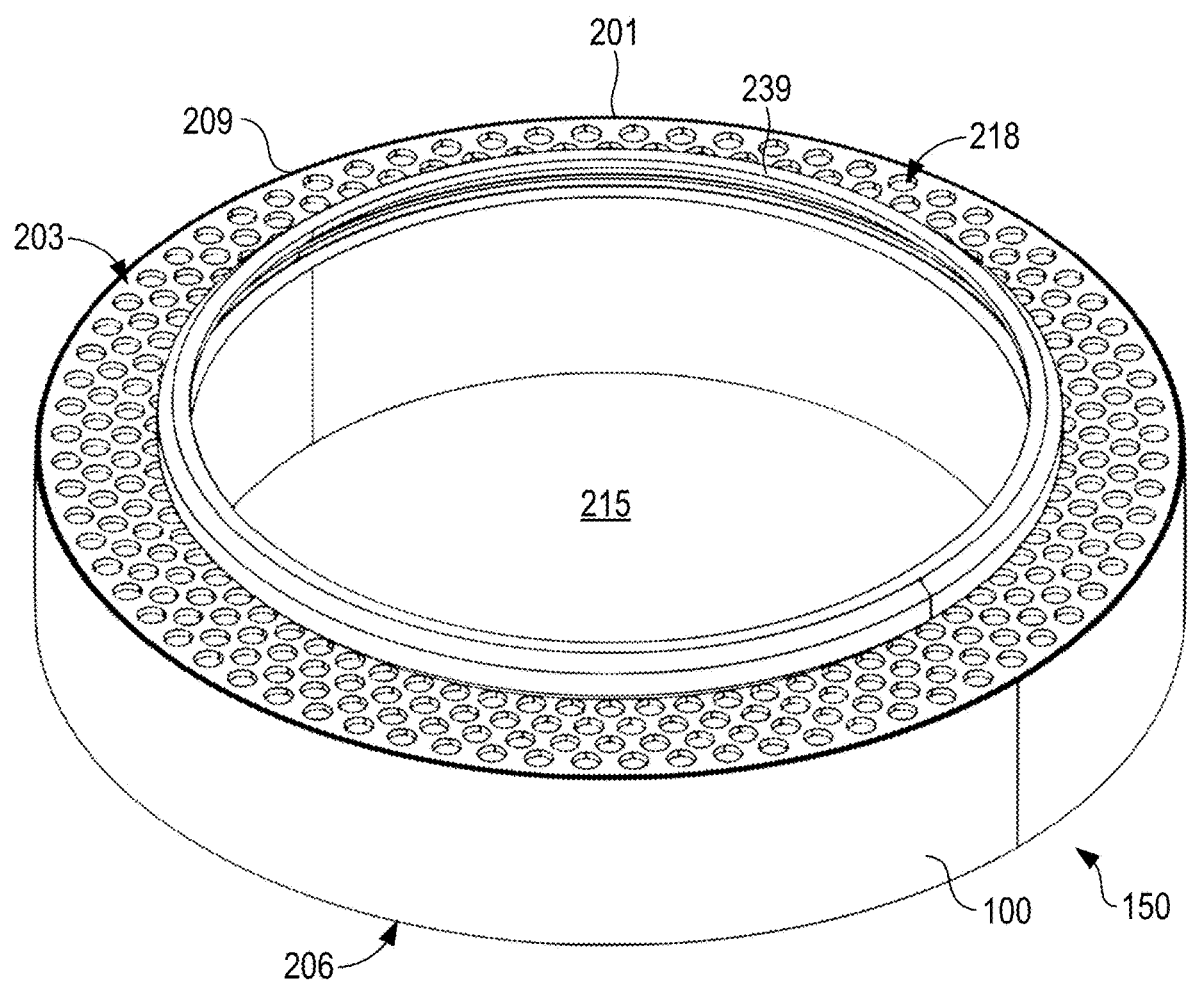
FIG. 2 is a top perspective view of a regenerator in accordance with various embodiments of the present disclosure.
Figure 3:
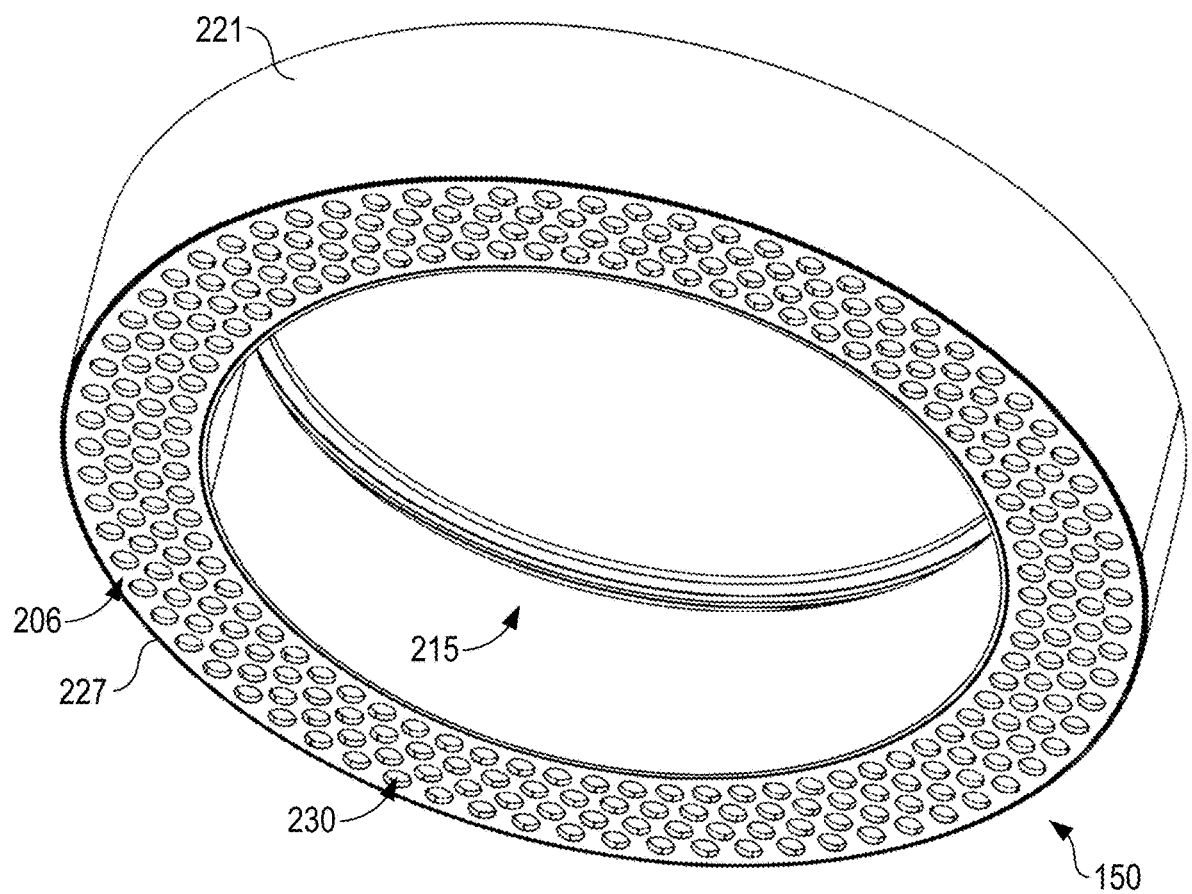
FIG. 3 is a bottom perspective view of a regenerator in accordance with various embodiments of the present disclosure.
Figure 4:
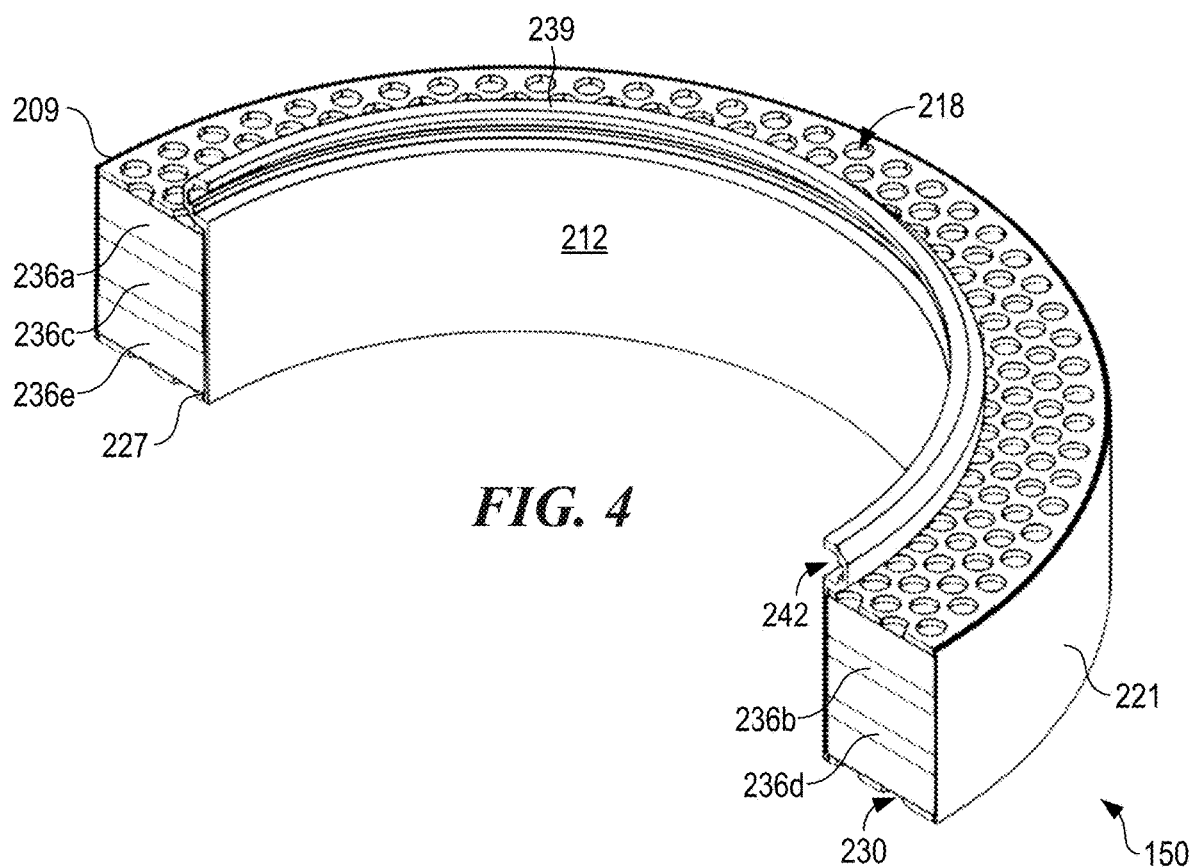
FIG. 4 is a perspective cross-section view of a portion of a regenerator in accordance with various embodiments of the present disclosure.
Figure 5:
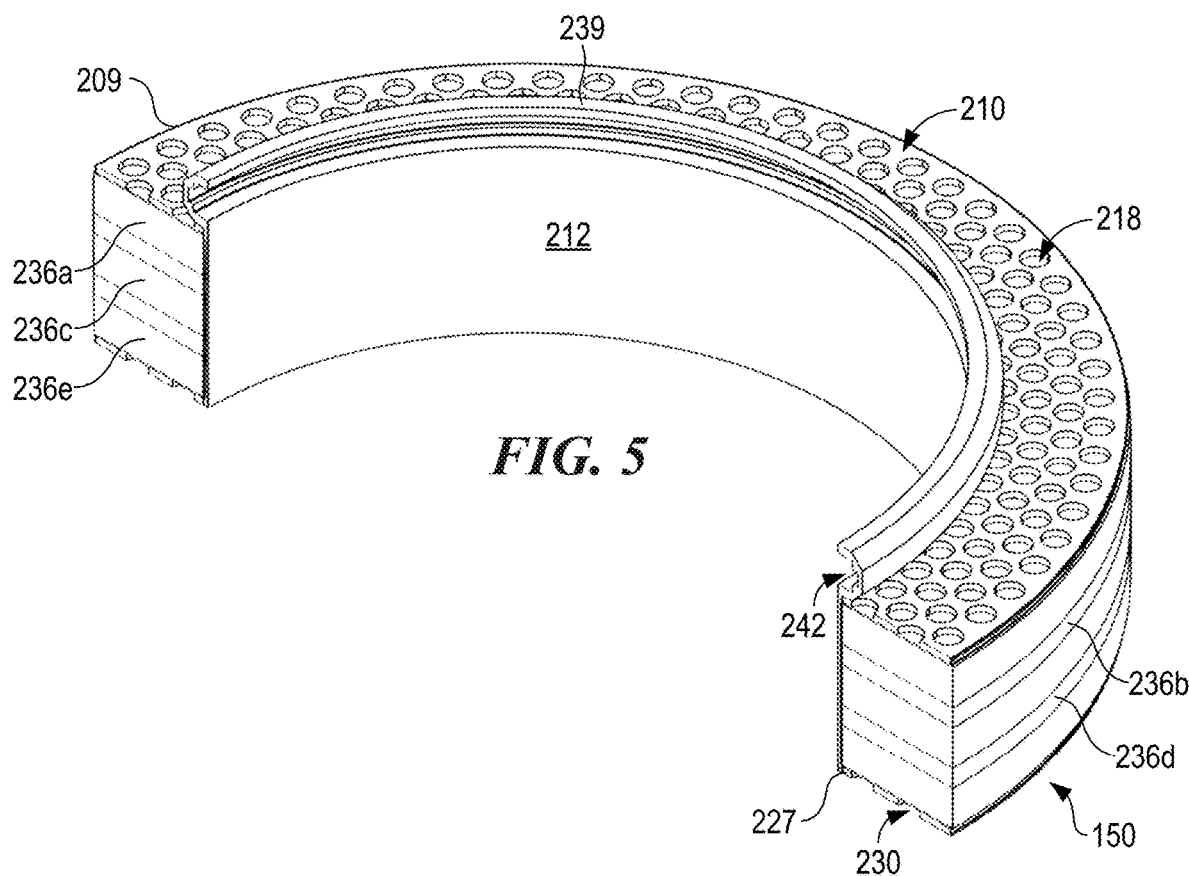
FIG. 5 is another perspective cross-section view of a portion of a regenerator in with an outer sleeve not shown accordance with various embodiments of the present disclosure.
Figure 6:
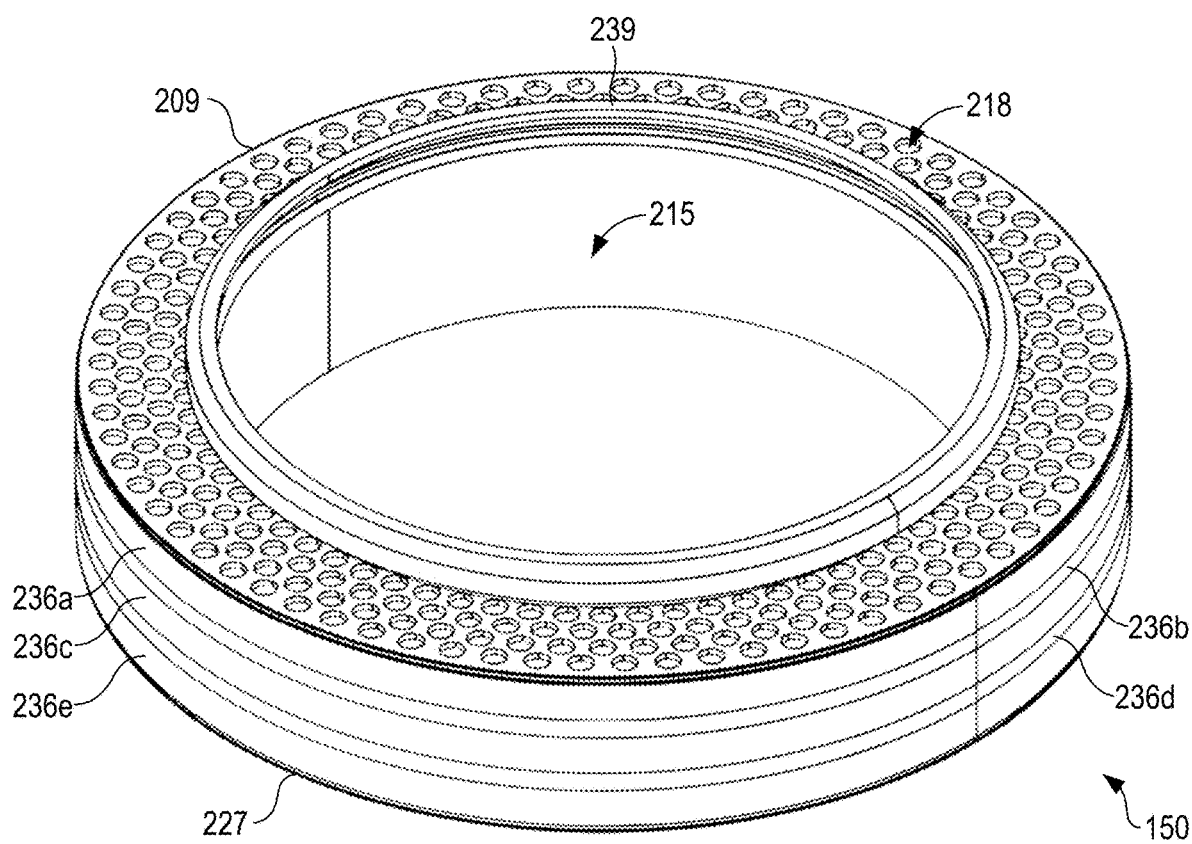
FIG. 6 is another top perspective view of a regenerator with an outer sleeve not shown in accordance with various embodiments of the present disclosure.
Figure 7:
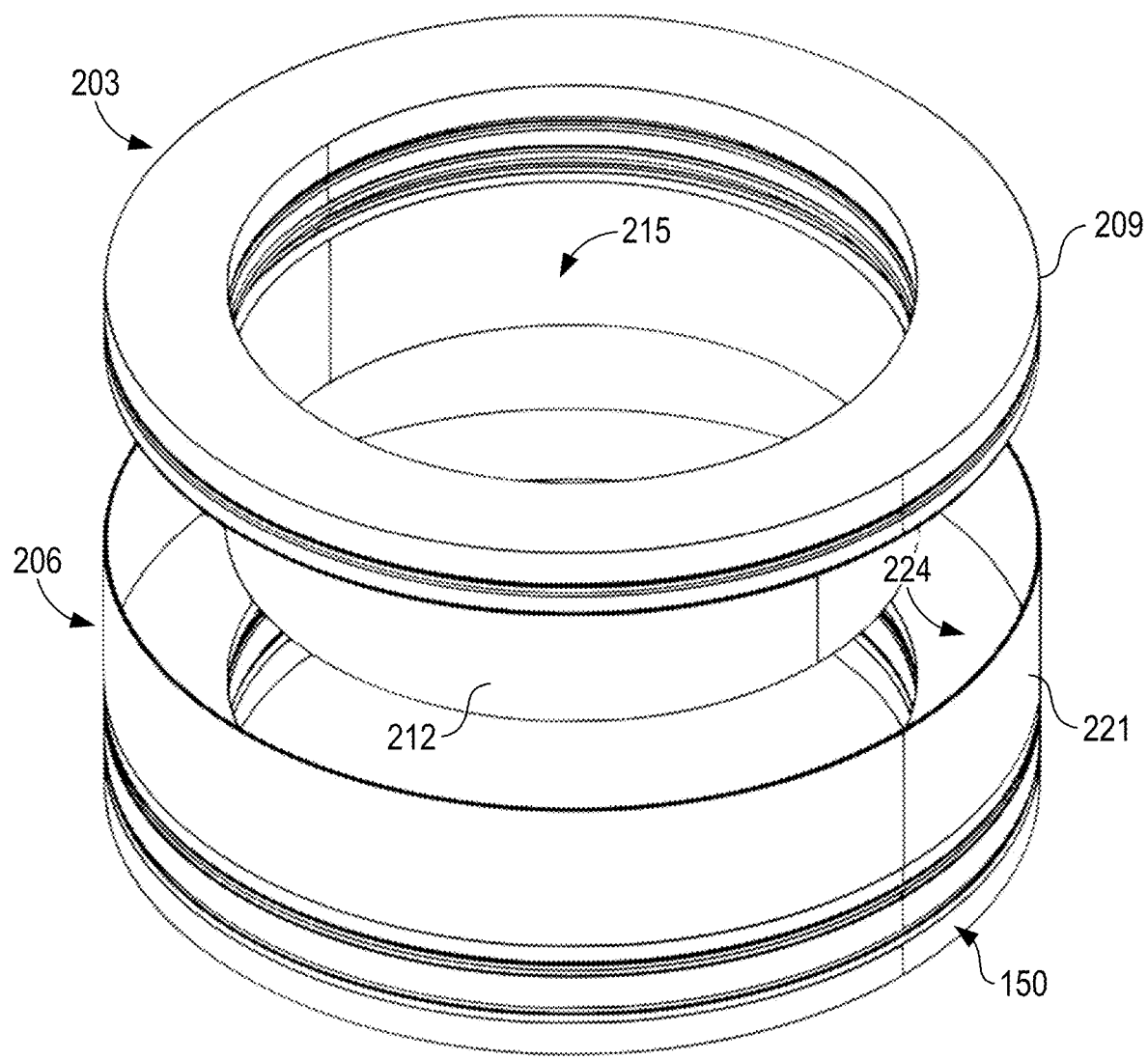
FIG. 7 is an exploded perspective view of a regenerator in accordance with various embodiments of the present disclosure.
Figure 8:
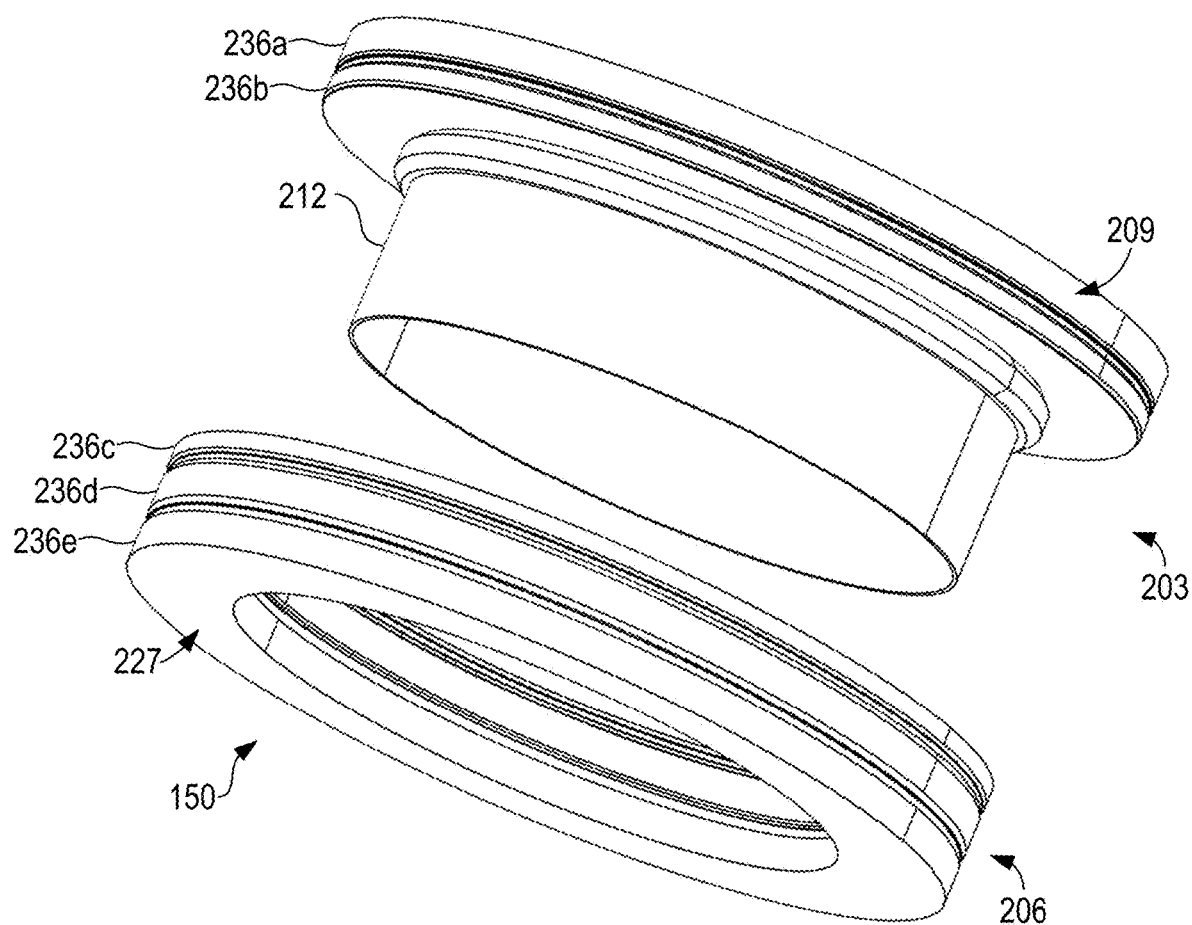
FIG. 8 is another exploded perspective view of a regenerator in accordance with various embodiments of the present disclosure.

Turning now to FIGS. 2-8, various perspective views of a non-limiting example of a regenerator 150 are shown according to various embodiments. More specifically, a top perspective view of a regenerator 150 is shown in FIG. 2, a bottom perspective view thereof is shown in FIG. 3, a perspective cross-section view thereof in shown in FIGS. 4 and 5, and another top perspective view thereof is shown in FIG. 6. For explanatory purposes, a top perspective exploded view is shown in FIG. 7 and a bottom perspective exploded view is shown in FIG. 8. As noted above, the regenerator 150 may be employed in the heat pump 100 or other device to adjust temperature of gas flowing therethrough.

Referring among FIGS. 2-8, the regenerator 150 may include an annular shaped body 201. A diameter of the annular shaped body 201 of the regenerator 150 may conform to an internal diameter of the heat pump 100 shown in FIG. 1. For instance, the diameter of the annual shaped body 201 may be substantially similar to a diameter of a portion of the heat pump 100 in which the regenerator 150 is positioned. Generally, the regenerator 150 may include a cover portion 203 and a base portion 206 among other portions not described in detail herein. The cover portion 203 may be detachably attached to the base portion 206, or may be formed integral with the base portion 206 in some embodiments.

As can be seen in the exploded views of FIGS. 7 and 8, the cover portion 203 may include, for example, a top lid 209 and an inner neck 212. The inner neck 212 may be a cylindrical body extending downward from the top lid 209. The inner neck 212 may be coupled to or integral with a bottom surface of the top lid 209. Together, the top lid 209 and the inner neck 212 have a notched region defining a central aperture 215, as can be seen in the exploded view of FIG. 8. A diameter of the inner neck 212 may be substantially similar to, but slightly greater than, a diameter of the aperture 215. As such, the annular shaped body 201 of the regenerator 150 may be described as being donut-shaped in some embodiments. However, it is understood that, in some embodiments, the central aperture 215 may be replaced with a substantially continuous body of the regenerator 150.

The top lid 209 may protrude or otherwise extend laterally with respect to the inner neck 212. To protrude from the inner neck 212, the top lid 209 may have a diameter greater than a diameter of the inner neck 212. Referring again to FIGS. 2-8 collectively, the top lid 209 may include top-side apertures 218 through which gas may be pumped or otherwise routed, for example, in a hot-to-cold cycle where a temperature of the gas is reduced. For clarity purposes, the top-side apertures 218 of the top lid 209 are not shown in the exploded views of FIGS. 7 and 8.

As can be further seen in the exploded views of FIGS. 7 and 8, the base portion 206 may include an outer surface 221, an inner ridge 224, and a bottom lid 227. The inner ridge 224 may include a step or a projection within the outer surface 221 on which the top lid 209 may be positioned, for instance, when the cover portion 203 is coupled to the base portion 206 for use. As such, at least a portion of the top lid 209 may be nested within the outer surface 221 of the base portion 206 when a bottom surface of the top lid 209 is situated on the inner ridge 224. Accordingly, when the top lid 209 is positioned within the outer surface 221 of the base portion 206, the top lid 209 will come into contact with the inner ridge 224 such that a top surface 210 of the top lid 209 may be substantially flush with a top edge of the outer surface 221, as shown in FIG. 2 for example.

Like the top lid 209, the bottom lid 227 may include a multitude of bottom-side apertures 230. The bottom-side apertures 230 and/or the top-side apertures 218 may be circular-shaped, as shown in FIGS. 2-6. However, in other implementations, the bottom-side apertures 230 and/or the top-side apertures 218 may include ovular-shaped apertures, square-shaped apertures, rectangular-shaped apertures, any combination thereof, and so forth. Like the top-side apertures 218, the bottom-side apertures 230 may be sufficient such that gas may be pumped or otherwise routed therethrough, for example, in a cold-to-hot cycle where a temperature of the gas is increased. For clarity purposes, the bottom-side apertures 230 of the bottom lid 227 are not shown in the exploded views of FIGS. 7 and 8. As shown in FIGS. 6 and 7, the inner neck 212 may nest within a central aperture 215 of the cover portion 203 and a central aperture 233 of the base portion 206 to align the top lid 209 with the bottom lid 227 or, in other words, the cover portion 203 with the base portion 206.

At least one of the cover portion 203 and the base portion 206 may include one or more thermal layers 236a . . . 236e (collectively "thermal layers 236"), as can be seen in the cross-section views of FIGS. 4 and 5 and the perspective view of FIG. 8. Specifically, FIG. 4 is a cross-section view of the regenerator 150 that includes the outer surface 221, whereas FIG. 5 is a cross-section view of the regenerator 150 with the outer surface 221 not being shown for explanatory purposes, thereby exposing sides of the thermal layers 236. Similarly, FIG. 8 is an exploded perspective view with the outer surface 221 not be shown, thereby providing a view of the thermal layers 236.

In FIGS. 4, 5, and 8, the thermal layers 236 are shown in a stacked arrangement where each thermal layer 236 is positioned vertically with respect to one another. Each of the thermal layers 236 may have a diameter substantially similar with respect to one another. While the non-limiting example of FIGS. 4, 5, and 8 shows five thermal layers 236, it is understood that the regenerator 150 may include two thermal layers, three thermal layers, four thermal layers, six thermal layers, seven thermal layers, and so forth, while not deviating from the principals of the present disclosure.

As can be seen in the exploded view of FIG. 8, a first portion of the thermal layers 236 may be part of the cover portion 203 and a second portion of the thermal layers 236 may be part of the base portion 206. However, it is understood that the cover portion 203 and/or the base portion 206 may be redesigned such that all of the thermal layers 236 are in the cover portion 203 or all of the thermal layers 236 are in the base portion 206. In any event, when the cover portion 203 is coupled to the base portion 206, all of the thermal layers 236 are stacked vertically with respect to one another, where each of the thermal layers 236 is positioned adjacent to another thermal layer 236.

A rim 239 may be coupled to or integral with the inner neck 212, which may project above a top surface of the top lid 209. The rim 219 may be configured to form a connection with another component of the heat pump 100 to retain the regenerator 150 in a desired position. For instance, the rim 239 may define a recess 242 or female connector configured to receive and form a connection with a suitably shaped projection or male connector, as may be appreciated.

According to various embodiments, each of the thermal layers 236 may be formed of a thermal material having a predetermined porosity and thermal characteristics to produce a desired cooling, heat storage, and/or insulative effect. For instance, in various embodiments, it may be desirable to have a portion of thermal layers 236 with thermally conductive properties and a portion of thermally layers 236 with thermally insulative properties.

For instance, referring specifically to FIGS. 4 and 5, a first thermal layer 236a may be formed of a thermally conductive material, a second thermal layer 236b may be formed of a thermally insulative material, a third thermal layer 236c may be formed of a thermally conductive material, a fourth thermal layer 236d may be formed of a thermally insulative material, and/or a fifth thermal layer 236e may be formed of a thermally conductive material, and so forth. In this implementation, each thermal layer 236 that is thermally conductive may absorb heat energy from the gas (thereby cooling the gas) and retain the heat energy in the respective thermal layer 236 without spreading heat to another thermal layer 236. Notably, the insulative thermal layers 236 prevent heat from spreading substantially beyond a respective conductive thermal layer 236. As such, heat is stored in a respective conductive thermal layer 236 without dissipation, where the heat may be used in heating gas in further cycles of the heat pump 100 or like device.

To this end, to cool a gas, the thermally conductive material of the first thermal layer 236a may be configured to reduce a temperature of the gas entering the top of the regenerator 150 from a top entrance temperature to a first temperature less than the top entrance temperature. The thermally conductive material of the third thermal layer 236c may be configured to reduce the temperature of the gas to a second temperature less than the first temperature. Additionally, the thermally conductive material of the fifth thermal layer 236e may be configured to reduce the temperature of the gas to a third temperature less than the second temperature.

Conversely, to heat a gas, the thermally conductive material of the fifth thermal layer 236e, the thermally conductive material of the third thermal layer 236c, and the thermally conductive material of the first thermal layer 236a may have heat stored therein, for instance, from a prior heating cycle. The thermally conductive material of the fifth thermal layer 236e may be configured to increase a temperature of gas entering the bottom of the regenerator 150 from a bottom entrance temperature to a first temperature greater than the bottom entrance temperature. The thermally conductive material of the third thermal layer 236c may be configured to increase the temperature of the gas to a second temperature less greater than the first temperature. Further, the thermally conductive material of the first thermal layer 136a may be configured to increase the temperature of the gas to a third temperature greater than the second temperature.

In some embodiments, each of the thermal layers 236 may be formed of a different thermal material or, in some embodiments, a portion of the thermal layers 236 may be formed of a same material. For instance, the thermal layers 236 that are thermally conductive may be formed of a metal mesh material, wire fragments, pellets, random-powdered material fragments, the like, and any combination thereof, whereas the thermal layers 236 that are thermally insulative may be formed of ceramics, plastics, fiber glass, the like, and any combination thereof. The metallic material may include, but is not limited to, steel, stainless steel, copper, aluminum, graphene, and so forth.

Figure 9:
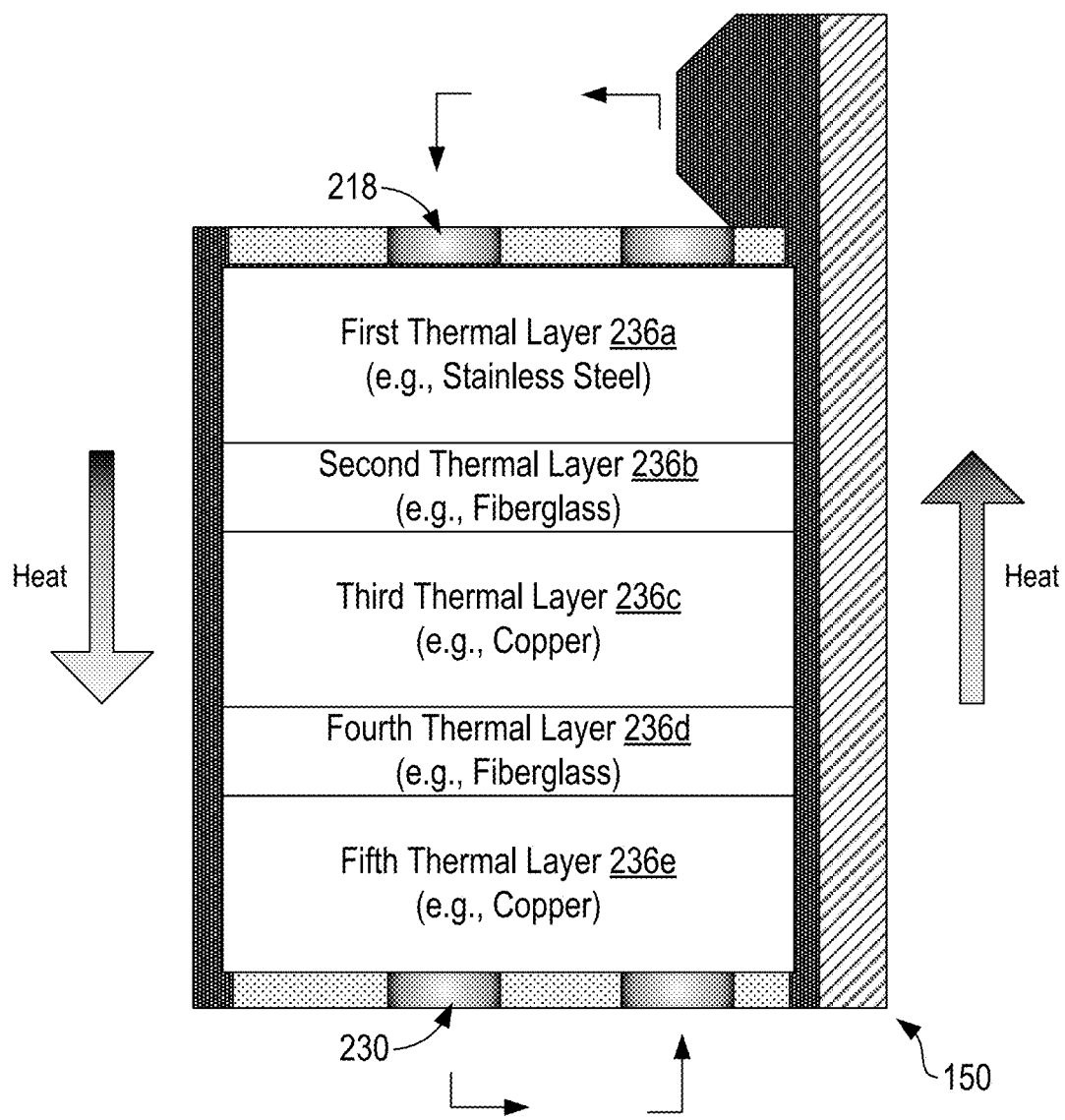
FIG. 9 is a cross-section view of a side of a regenerator in accordance with various embodiments of the present disclosure.

As for but one example, FIG. 9 is a cross-section view of a side of a regenerator 150 in accordance with various embodiments of the present disclosure for unidirectional and/or bi-directional heat transfer and storage from a working gas in motion. The first thermal layer 236a may be formed of a thermally conductive material such as stainless steel, the second thermal layer 236b may be formed of a thermally insulative material such as fiber glass, the third thermal layer 236c may be formed of a thermally conductive material such as copper, the fourth thermal layer 236d may be formed of a thermally insulative material such as fiber glass, the fifth thermal layer 236e may be formed of a thermally conductive material such as stainless steel, and so forth. It is understood that any combination of the foregoing materials may be employed by varying the arrangement of the thermal layers 236.

This arrangement of different thermal layers 236 formed of varying thermal materials will make temperature gradients of the regenerator 150 different. Notably, highly conductive materials will absorb more heat thoroughly, and insulator materials will block heat from passing easily from one conductive thermal layer 236 to another.

As such, a first material having first thermal characteristics may be selected in the first thermal layer 236a to reduce a gas from an entrance temperature (when flowing from top to bottom via the top-side apertures 218) to a first lower temperature, and a second material having second thermal characteristics may be selected in the second thermal layer 236b to retain heat in the first thermal layer 236a (and the third thermal layer 236c). Similarly, a third material having third thermal characteristics may be selected in the third thermal layer 236c to reduce a gas from the first temperature to a second lower temperature, and a fourth material having second thermal characteristics may be selected in the fourth thermal layer 236d to retain heat in the third thermal layer 236c (and the fifth thermal layer 236e).

A fifth material having fifth thermal characteristics may be selected in the fifth thermal layer 236e to reduce a gas from the second temperature to a third lower temperature, and so forth. It is understood that the first, second, third, fourth, and fifth materials may be different from one another, or a subset of the materials may be the same. Likewise, the first temperature, the second temperature, and the third temperature may be different from one another, where the first temperature is greater than the second temperature and the third temperature and the second temperature is greater than the third temperature.

The thermal layers 236 may have a predetermined porosity that permits gas to flow through a body of the thermal layers 236 while still providing a strong heat capture effect. For instance, thermal layers 236 having thermal conductivity may have a porosity greater than the thermal layers 236 having a thermal insulative effect. In some embodiments, each of the thermal layers 236, or a portion thereof, may have differing porosities as compared to other thermal layers 236.

In some embodiments, the regenerator 150 includes an input end (e.g., a top surface) adapted to receive gas at an input temperature and an output end (e.g., a bottom surface) adapted to output gas at an exit temperature. The regenerator 150 further includes a first thermal layer 236a formed of a thermally conductive material, a second thermal layer 236b formed of a thermally insulative material, where the first material is different than the second material, and a third thermal layer 236c formed of a thermally conductive material. The second thermal layer 236b may be configured to impair heat from transferring from the first thermal layer 236a to the third thermal layer 236c and from the third thermal layer 236c to the first thermal layer 236a. In various embodiments, the conductive materials may have a predetermined porosity between 10% and 90%.

As noted above, prior designs of a regenerator 150 were simplistic and minimal, merely allowing working gas to pass from one direction (e.g., a top to bottom direction) to deposit heat and cool down as it moves downwards towards a bottom of the heat pump 100. Then, the working gas comes back from another direction (e.g., bottom to top direction) to withdraw heat and heat up as it moves upwards towards a top of the heat pump 100. The foregoing reversing flow pattern requires a reciprocating motion using, for example, displacers 109, 115. However, this reciprocating motion leads to many unwanted consequences including, but not limited to, excessive vibration causing energy loss, inefficient volume efficiency requiring a large machine, and so forth.

Accordingly, various embodiments are further described for a regenerator 150 for use in a constant flow regenerative cycle that, like the embodiments described above, allow a working gas to deposit heat gradually in one location then withdrawn heat gradually in another location. The regenerator 150 may be referred to as a thermally communicating regenerator 150. Further, the regenerator 150 may maintain a temperature gradient between a high temperature side and a low temperature side. The regenerator 150 will provide a small pressure drop across, as is desirable, while possessing sufficient heat storage capacity.

As the displacers 109, 115 of the heat pump 100 described above move in a linear motion, more space is required and various inefficiencies occur. For instance, gas capture in the tubes leading up to the regenerator 150 occur using reciprocating motion. Additionally, gas that is heated may not always reach the regenerator 150 (or beyond the regenerator 150). In other words, gas placed in the chamber isn't used with 100% efficiency. It may be ideal in some heat pumps 100 to replace linear motion mechanisms (e.g., linear piston devices) using rotary motion provided by scroll compressors, rotary compressors, and the like which are more efficient in volume. As such, the displacers 109, 115 may be substituted with scroll compressors, rotary compressors, or like device that moves working gas in a circular type pattern. To do so, a problem occurs regarding how to direct the working gas through the regenerator 150.

Figure 10:
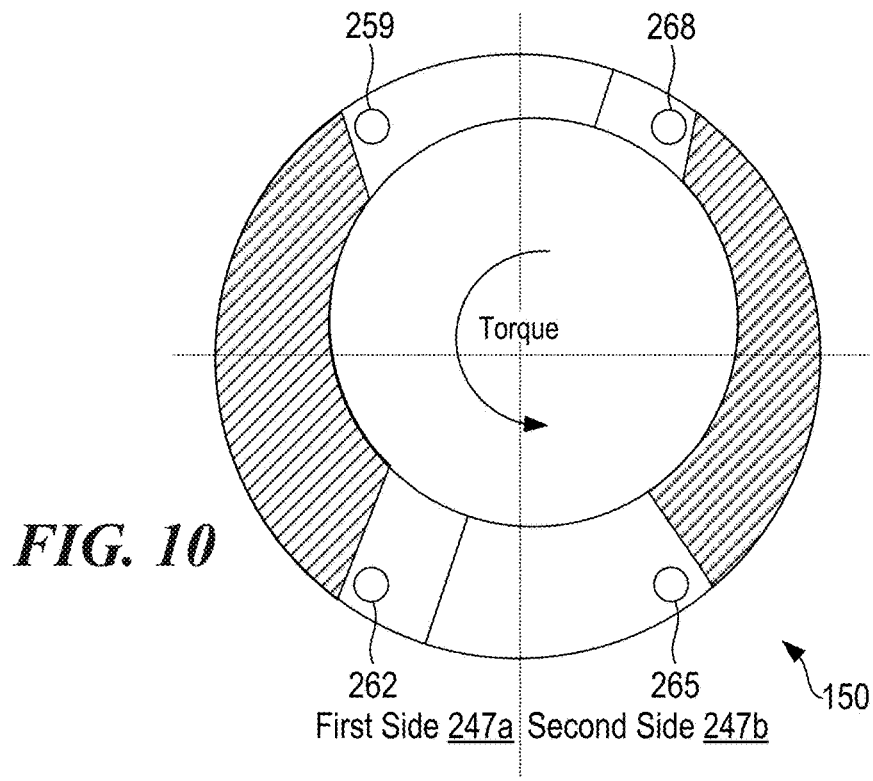
FIG. 10 is a top plan view of a middle thermal layer of a regenerator in accordance with various embodiments of the present disclosure.
Figure 11:
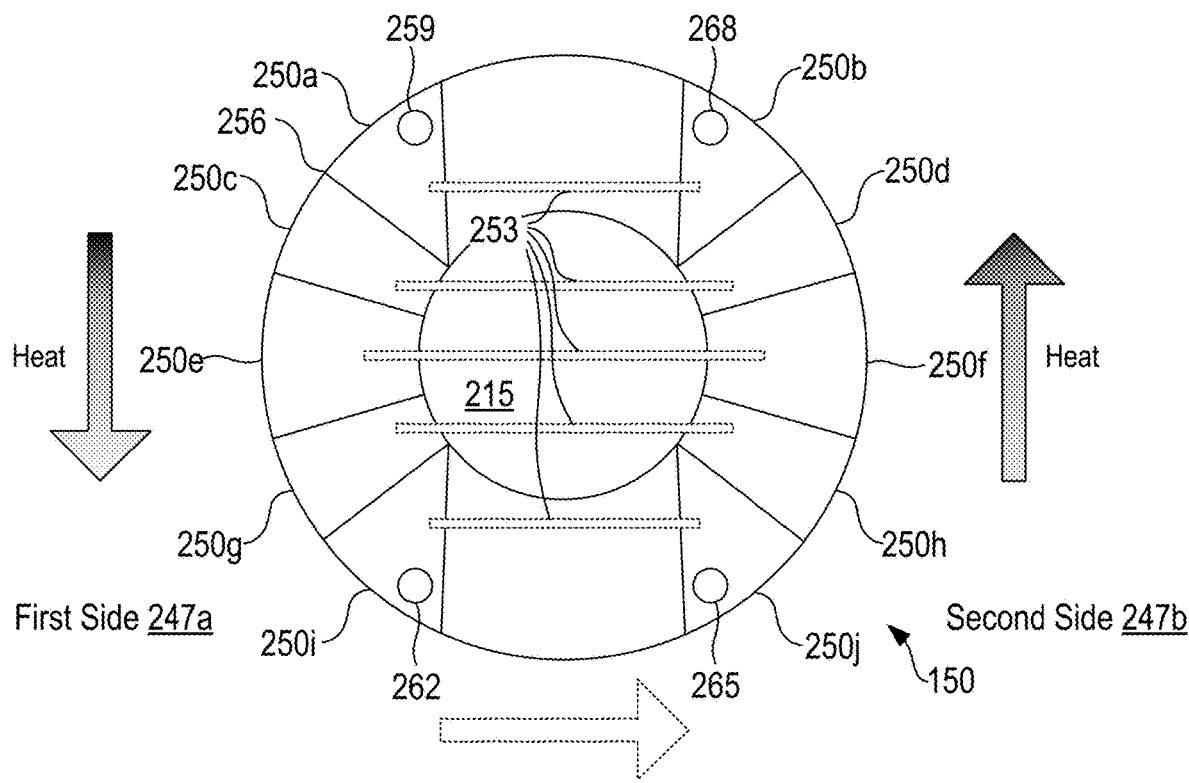
FIG. 11 is another top plan view of a regenerator in accordance with various embodiments of the present disclosure.

Accordingly, FIG. 10 is a top plan view of a middle layer of a regenerator 150 and FIG. 11 is a top plan view of the regenerator 150 in accordance with various embodiments of the present disclosure. The regenerator 150 of FIGS. 10 and 11 may permit a constant flow regenerative cycle that permits a working gas to deposit heat gradually in one location (e.g., a first side 247a of the regenerator 150) and later withdraw heat gradually in another location (e.g., a second side 247b of the regenerator 150). The regenerator 150 may thus main a temperature gradient between a high temperature side and a low temperature side, as will be discussed. The regenerator 150 has a small pressure drop across the regenerator 150 while possessing sufficient heat storage capacity.

Generally, the regenerator 150 may include a plurality of thermal sections 250a . . . 250j (collectively "thermal sections 250"). The thermal sections 250 may include a first thermal section 250a, a second thermal section 250b, a third thermal section 250c, a fourth thermal section 250d, a fifth thermal section 250e, a sixth thermal section 250f, a seventh thermal section 250g, a eighth thermal section 250h, a ninth thermal section 250i, and a tenth thermal section 250j. While the regenerator shown in FIGS. 10 and 11 include ten thermal sections, it is understood that other numbers of the thermal sections 250 may be employed as desired. In some embodiments, each of the thermal sections 250 include pie-shaped regions that span from a bottom surface of the regenerator 150 to a top surface of the regenerator 150. Further, each of the thermal sections 250 may be formed of a thermally conductive material, such as steel, stainless steel, copper, aluminum, graphene, any combination thereof, and so forth.

The first thermal section 250a, the third thermal section 250c, the fifth thermal section 250e, the seventh thermal section 250g, and the ninth thermal section 250i may be positioned on a first side 247a of the regenerator 150. The second thermal section 250b, the fourth thermal section 250d, the sixth thermal section 250f, and the tenth thermal section 250j may be positioned on a second side 247b of the regenerator 150 opposite that of the first side.

The regenerator 150 may further include a plurality of thermal members 253 thermally coupled to individual ones of the thermal sections 250. Further, a first thermal member 253 may thermally couple the first thermal section 250a and the second thermal section 250b, a second thermal member 253 may thermally couple the third thermal section 250c and the fourth thermal section 250d, a third thermal member 253 may thermally couple the fifth thermal section 250e and the sixth thermal section 250f, a fourth thermal member 253 may thermally couple the seventh thermal section 250g and the eight thermal section 250h, and a fifth thermal member 253 may thermally couple the ninth thermal section 250i and the tenth thermal section 250j. The thermal members 253 may include elongated members formed of a conductive material sufficient for transferring heat collected on the first side of the regenerator 150 to the second side of the regenerator 150 for future use, as will be described. In some embodiments, one or more of the thermal members 253 may include a rectangular- or cylinder-shaped body, whether flat or having an appreciable height. As such, the thermal members 253 may include heat pipes (e.g., copper heat pipes, graphite heat pipes, graphene heat pipes, or aluminum heat pipes), copper rods, and the like.

The regenerator 150 may further include insulator sections 256 that may be disposed between adjacent thermal sections 250 which prevent heat from leaving a thermal section 250 other than by way of the thermal members 253, thereby storing a bulk of the heat in opposing sides of the regenerator 150. The thermal sections 235 that are thermally conductive may be formed of a metal mesh material and the like, whereas the insulator sections 256 that are thermally insulative may be formed of ceramics, plastics, fiber glass, and the like.

The heat pump 100, using a rotary or scroll compressor, for example, may generate torque that causes gas to move in an annular direction, such as a counter-clockwise direction as shown in FIG. 10. Alternatively, the torque may cause gas to move in a clockwise direction, as can be appreciated. Additionally, by adding heat to the regenerator 150 or encompassing system, the addition of heat will cause a working gas to expand isothermally, which generates torque that pushes a vane or like device in the left, counter-clockwise direction.

For the sake of explanation, where torque causes gas to move in a counter-clockwise direction, working gas may be routed to the regenerator 150 via inlet 259 from a hot chamber of the heat pump 100 or like apparatus, where the inlet 259 may be referred to as a hot chamber inlet 259. Then, the working gas from the hot chamber deposits heat in the first thermal section 250a and moves in the counter-clockwise direction laterally between a top surface and a bottom surface of the regenerator 150, depositing additional heat in the adjacent sections, namely, third thermal section 250c, fifth thermal section 250e, seventh thermal section 250g, ninth thermal section 250i, and so forth. It is understood that the insulator sections 256 do not prevent the working gas from moving from one thermal section 250 to another while sufficiently maintaining a temperature gradient in a respective thermal section 250.

The gas is expelled from the regenerator 150 via outlet 262 to a cold chamber, for example. As such, the outlet 262 may be referred to as a cold chamber outlet 262. When a working gas, such as helium, hydrogen, etc., is directed through the first side 247a of the regenerator 150, the gas is cooled down from an entrance temperature (e.g., 600° C.) in the inlet 259 to an exit temperature (e.g., 80° C.) dispelled from the outlet 262, where the exit temperature is less than the entrance temperature. Again, the regenerator 150 does not output the heat to other components of the heat pump 100. Instead, the regenerator 150 stores the heat by transferring the heat from the first side 247a to the second side 247b, as will be further described.

Thereafter, it is understood that working gas may be routed to the regenerator 150 via another inlet 265 from a cold chamber of the heat pump 100 or like apparatus, where the inlet 265 may be referred to as a cold chamber inlet 265. As the working gas is cold, the working gas from the cold chamber collects heat stored in the tenth thermal section 250j and moves in the counter-clockwise direction laterally between a top surface and a bottom surface of the regenerator 150, collecting additional heat and raising a temperature of the working gas in the adjacent sections, namely, eighth thermal section 250h, sixth thermal section 250f, fourth thermal section 250d, second thermal section 250b, and so forth. Again, it is understood that the insulator sections 256 do not prevent the working gas from moving from one thermal section 250 to another while sufficiently maintaining a temperature gradient in a respective thermal section 250.

The working gas is then expelled from the regenerator 150 via outlet 268 to the hot chamber of the heat pump 100, for example. As such, the outlet 268 may be referred to as a hot chamber outlet 268. When a working gas, such as helium, hydrogen, etc., is directed through the second side 247b of the regenerator 150, the gas is heated from an entrance temperature (e.g., 80° C.) in the inlet 265 to an exit temperature (e.g., 600° C.) dispelled from the outlet 268, where the exit temperature is greater than the entrance temperature. Again, the regenerator 150 does not output the heat to other components of the heat pump 100.

The hot chamber inlet 259, the cold chamber outlet 262, the cold chamber inlet 265, the hot chamber outlet 268, as well as other inlets and outlet, may be unidirectional outlets, meaning gas transfers through the respective inlet or outlet in a single direction. As such, no reverse flow of working gas is permitted. To this end, the inlets and/or outlets may utilize one-way valves and the like. In some embodiments, the inlets and outlets have a depth substantially matching a height of the regenerator 150 measured from a bottom surface to a top surface. In alternative embodiments, the inlets and outlets have a smaller depth, for instance, a depth sufficient to direct the working gas to a middle region of a respective thermal section 250.

The inlet 259 may be described as being positioned in and thermally coupled to the first thermal section 250a, the outlet 262 may be described as being positioned in and thermally coupled to the ninth thermal section 250i, the inlet 265 may be described as being positioned in and thermally coupled to the tenth thermal section 250k, and the outlet 268 may be described as being positioned in and thermally coupled to the second thermal section 250b.

In some embodiments, each of the thermal sections 250 are formed of a porous medium that effectively captures heat from the working gas. Some non-limiting examples of porous mediums include conductive wire mesh (e.g., stainless steel or copper mesh material) and conductive open cell porous mediums. As there may be a significant temperature gradient, the regenerator 150 may have a layered structure made up of the thermal sections 250 with a thin insulator section 256 therebetween, where each thermal section 250 is configured to store heat at a specific temperature range.

The regenerator 150 permits nearly all the working gas to proceed through isothermal expansion, regenerative cooling, isothermal contraction, and regenerative heating cycles. The volumetric efficiency may be 100% if leakage is negligible. The high volumetric efficiency is a significant advantage over reciprocating mechanisms. Additionally, the mixture of hot and cold working gases inside a regenerator 150 in a reciprocating mechanism may result in significant energy losses, and reduces power density (e.g., capacity per unit machine size).

Figure 12:
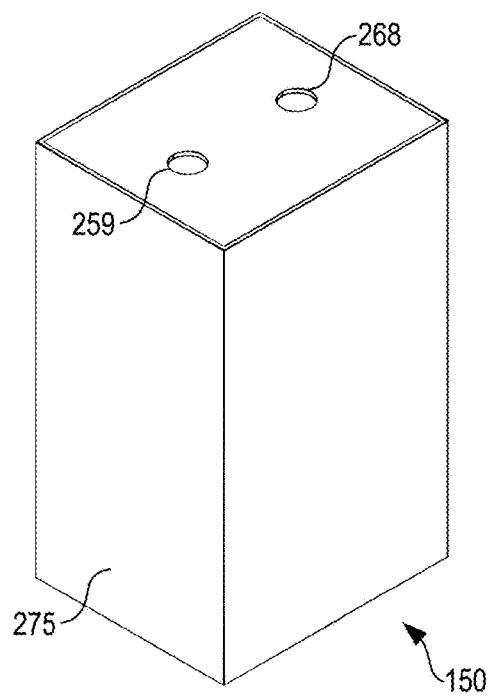
FIGS. 12 and 13 are top perspective views of a regenerator in accordance with various embodiments of the present disclosure.
Figure 13:
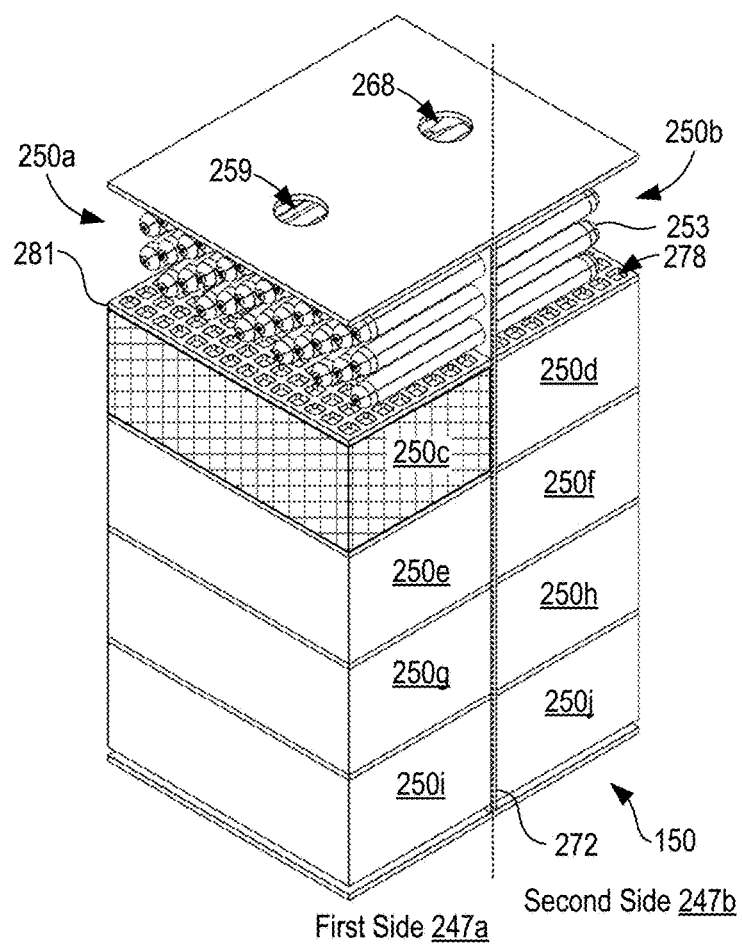
Figure 14:
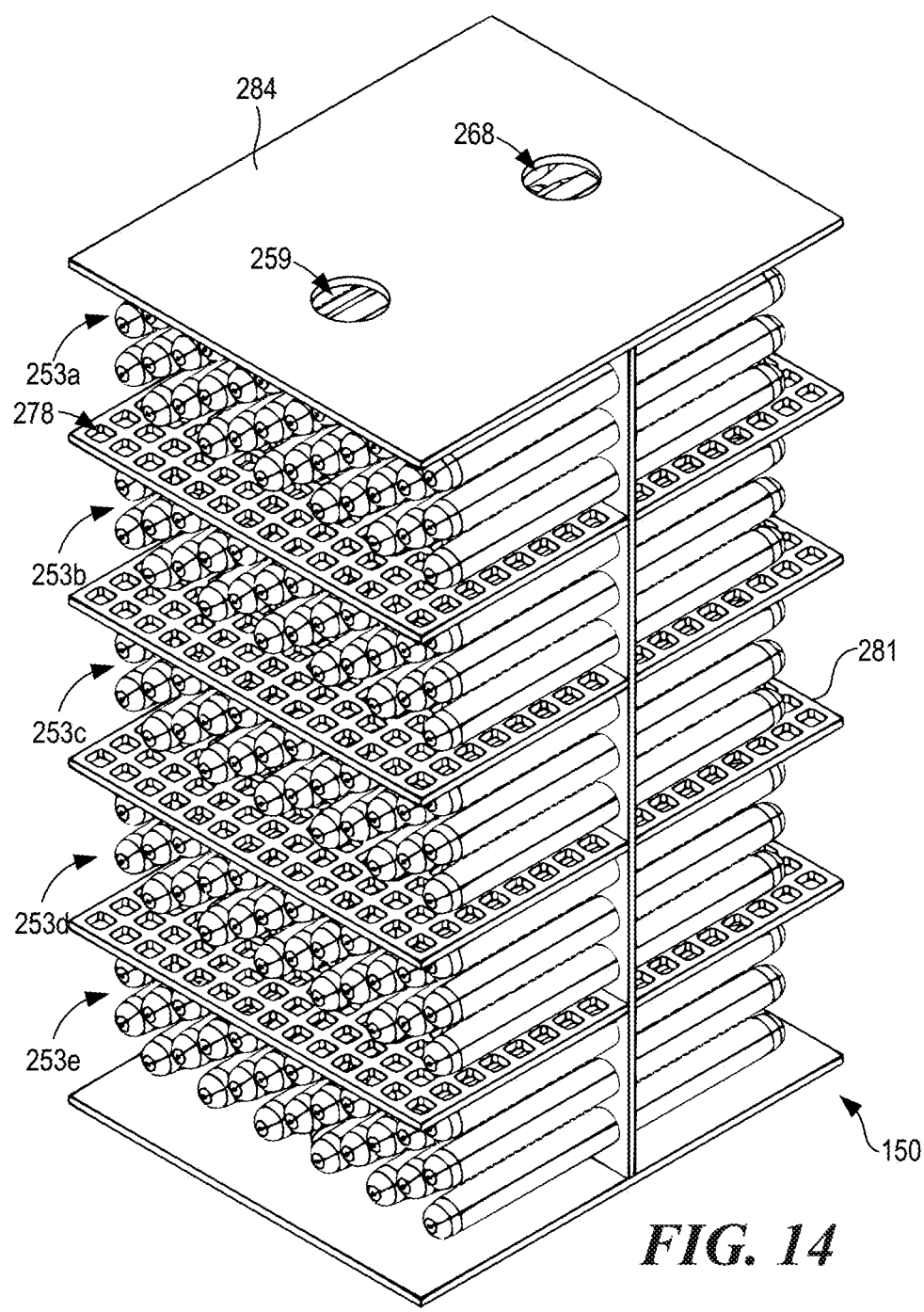
FIG. 14 is another top perspective view of a regenerator in accordance with various embodiments of the present disclosure.
Figure 15:
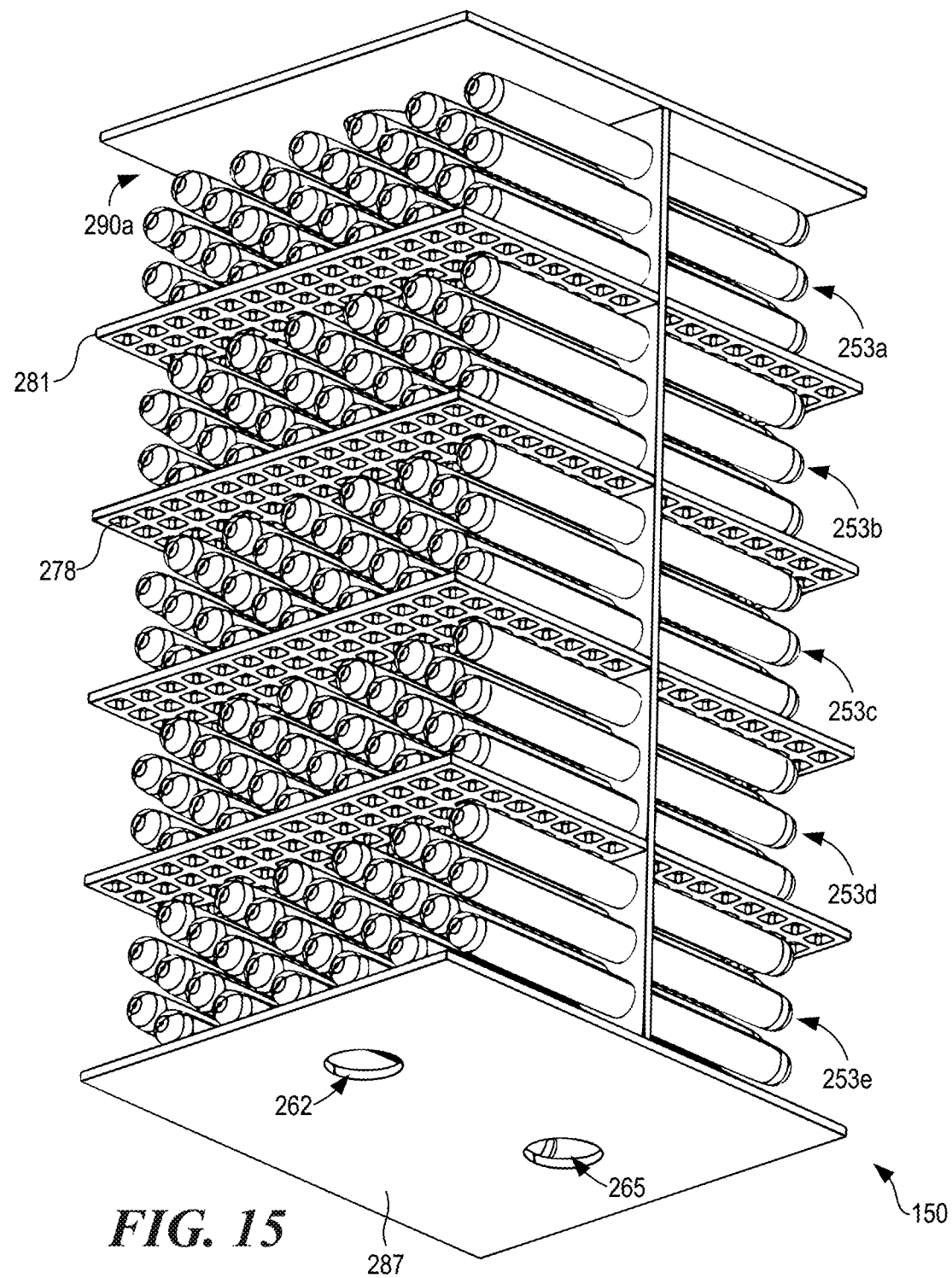
FIG. 15 is a bottom perspective view of a regenerator in accordance with various embodiments of the present disclosure.
Figure 16:
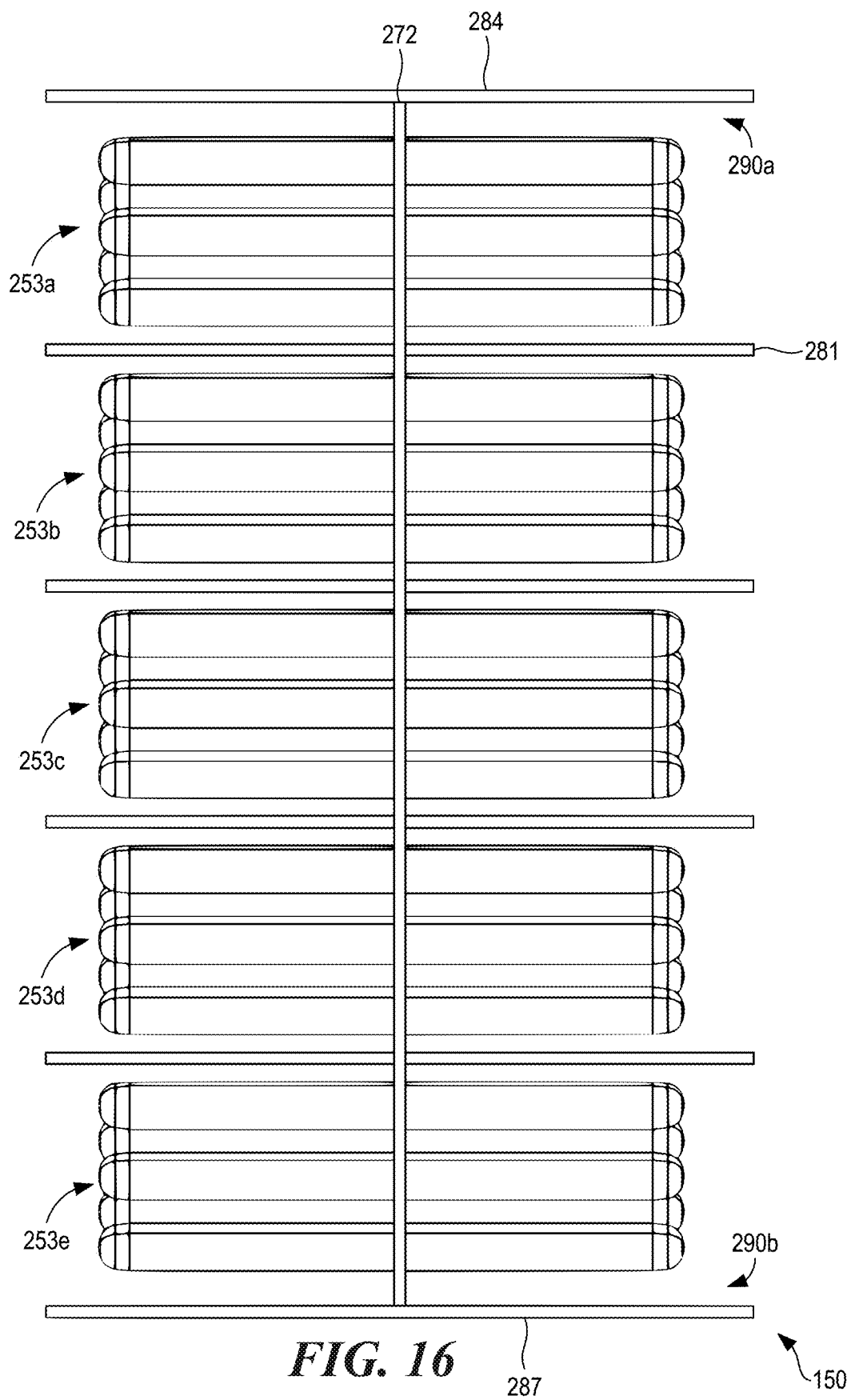
FIG. 16 is a side elevation view of a regenerator in accordance with various embodiments of the present disclosure.
Figure 17:
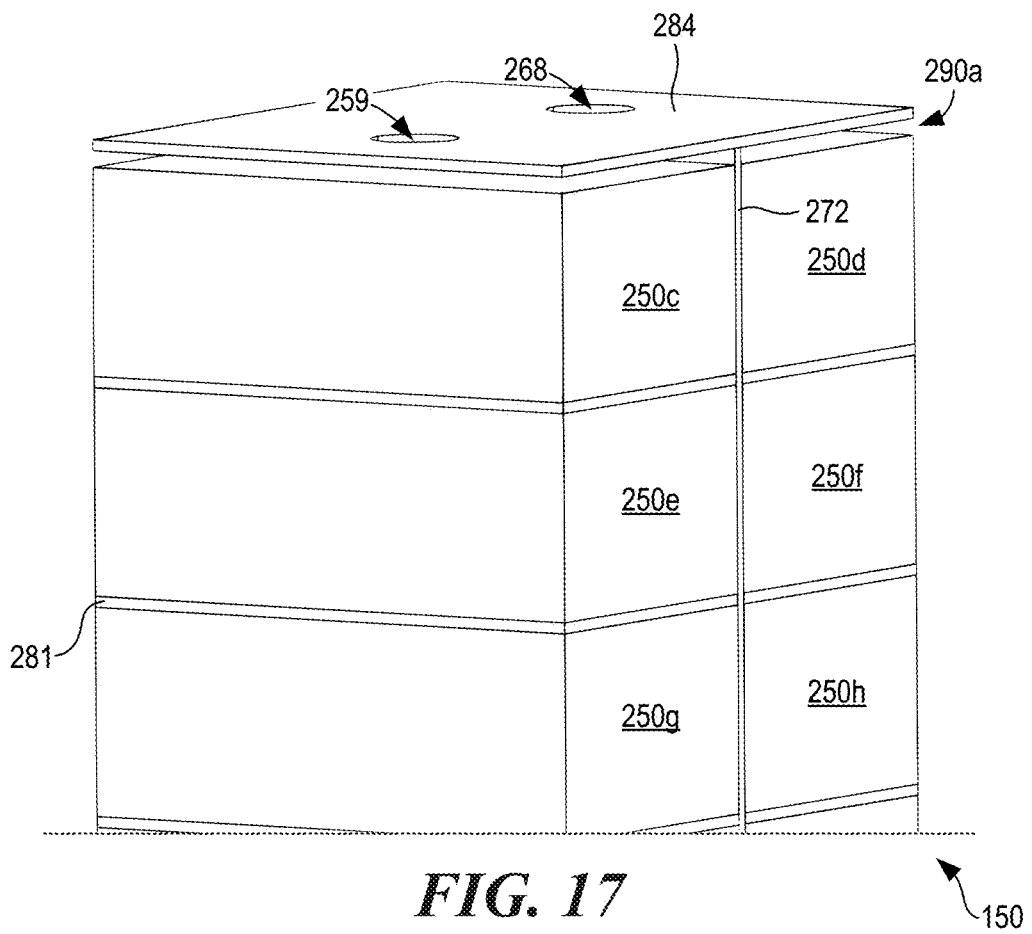
FIG. 17 is a partial enlarged view of a regenerator in accordance with various embodiments of the present disclosure.

Referring now to FIGS. 12-17, another embodiment of a regenerator 150 is shown according to various embodiments. Specifically, the regenerator 150 may include one for use with rotary motion provided by scroll compressors, rotary compressors, and the like which are more efficient in volume. FIGS. 12 and 13 are top perspective views of a regenerator 150 in accordance with various embodiments of the present disclosure where, in FIG. 13, a housing cover and section covers are not shown for explanatory purposes. FIG. 14 is another top perspective view of the regenerator 150, FIG. 15 is a bottom perspective view of the regenerator 150, FIG. 16 is a front elevation view of the regenerator 150, and FIG. 17 is an enlarged partial view of the regenerator 150 in accordance with various embodiments of the present disclosure.

While various embodiments of the regenerator 150 described herein show a cylindrical and donut-shaped housing having a centrally located aperture, the regenerator 150 of FIGS. 12-17 may include a rectangular, square, or other shaped housing in some embodiments. The regenerator 150 of FIGS. 12-17 may permit a constant flow regenerative cycle that permits a working gas to deposit heat gradually in one location (e.g., a first side 247a of the regenerator 150) and later withdraw heat gradually in another location (e.g., a second side 247b of the regenerator 150). The regenerator 150 may thus main a temperature gradient between a high temperature side and a low temperature side, as will be discussed.

Generally, the regenerator 150 may include a plurality of thermal sections 250a . . . 250j (collectively "thermal sections 250"). The thermal sections 250 may include a first thermal section 250a, a second thermal section 250b, a third thermal section 250c, a fourth thermal section 250d, a fifth thermal section 250e, a sixth thermal section 250f, a seventh thermal section 250g, a eighth thermal section 250h, a ninth thermal section 250i, and a tenth thermal section 250j. While the regenerator shown in FIGS. 12-16 include ten thermal sections, it is understood that other numbers of the thermal sections 250 may be employed as desired.

In some embodiments, each of the thermal sections 250 include rectangular- or square-shaped regions that span laterally from and to a respective side of a divider 272 (also referred to as a vertical divider 272) of the regenerator 150 to an outer housing 275 of the regenerator 150. In various embodiments, the housing 275, also referred to as a shell, may provide a seal at a predetermined pressure, such as approximately 20 bar (290 psi). Each of the thermal sections 250 may be formed of a thermally conductive material, such as steel, stainless steel, copper, aluminum, graphene, any combination thereof, and so forth. Each of the thermal sections 250 may be formed of conductive mesh material, as shown in the third thermal section 250c in FIG. 13. FIG. 14, for example, shows the regenerator 150 without the conductive mesh material such that the thermal members 253 can be seen.

The first thermal section 250a, the third thermal section 250c, the fifth thermal section 250e, the seventh thermal section 250g, and the ninth thermal section 250i may be positioned on a first side 247a of the regenerator 150. The second thermal section 250b, the fourth thermal section 250d, the sixth thermal section 250f, and the tenth thermal section 250j may be positioned on a second side 247b of the regenerator 150 opposite that of the first side.

The regenerator 150 may further include a multitude of thermal members 253a . . . 253e (collectively "thermal members 253") thermally coupled to individual ones of the thermal sections 250. For example, a first set of thermal members 253a may thermally couple the first thermal section 250a and the second thermal section 250b, a second set of thermal members 253b may thermally couple the third thermal section 250c and the fourth thermal section 250d, a third set of thermal members 253c may thermally couple the fifth thermal section 250e and the sixth thermal section 250f, a fourth set of thermal members 253d may thermally couple the seventh thermal section 250g and the eight thermal section 250h, and a fifth set of thermal members 253e may thermally couple the ninth thermal section 250i and the tenth thermal section 250j. Like the thermal members 253 described above, the thermal members 253 may include elongated members formed of a conductive material sufficient for transferring heat collected on the first side 247a of the regenerator 150 to the second side 247b of the regenerator 150 for future use, as will be described. In various embodiments, the thermal members 253 may include heat pipes, copper rods, and the like. The thermal members 253 may be positioned within a mesh or other conductive material.

While each of the sets of the thermal members 253 are shown in a 6×5 matrix arrangement defining thirty thermal members 253, it is understood that other arrangements of the thermal members 253 may be employed as well as other number of thermal members 253 depending on desired operating characteristics of the regenerator 150.

The regenerator 150 may further include the divider 272 that may be disposed between adjacent thermal sections 250. The divider 272 may extend vertically to define the first side 247a and the second side 247b, for example. The divider 272 may include apertures or cut-outs having a dimension similar to a diameter of the thermal members 253 that allow the thermal members 253 (e.g., heat pipes) to pass through while preventing the working gas from moving between horizontally-disposed sections.

The divider 272 may be insulative to prevent heat from leaving a thermal section 250 other than by way of the thermal members 253, thereby storing a bulk of the heat in opposing sides of the regenerator 150. The thermal sections 235 that are thermally conductive may be formed of a metal mesh material and the like, whereas the divider 272 and other components that are thermally insulative may be formed of ceramics, plastics, fiber glass, and the like.

The heat pump 100, using a rotary or scroll compressor, for example, may generate torque that causes gas to move in an annular direction, such as a counter-clockwise direction. Alternatively, the torque may cause gas to move in a clockwise direction, as can be appreciated. Additionally, by adding heat to the regenerator 150 or encompassing system, the addition of heat will cause a working gas to expand isothermally, which generates torque that pushes a vane or like device in the left, counter-clockwise direction.

For the sake of explanation, where torque causes gas to move in a counter-clockwise direction, working gas may be routed to the regenerator 150 via inlet 259 from a hot chamber of the heat pump 100 or like apparatus, where the inlet 259 may be referred to as a hot chamber inlet 259. Then, the working gas from the hot chamber deposits heat in the first thermal section 250a and moves downward vertically between a top surface and a bottom surface of the regenerator 150, depositing additional heat in the adjacent sections, namely, third thermal section 250c, fifth thermal section 250e, seventh thermal section 250g, ninth thermal section 250i, and so forth. It is understood that the divider 272 prevents the working gas from moving from one thermal section 250 to another while sufficiently maintaining a temperature gradient in a respective thermal section 250. The working gas, however, may flow through apertures 278 of a horizontal divider 281 that may be disposed between vertically-stacked thermal sections 250. The horizontal divider 281, like the vertical divider 272, may be formed of a conductive material. The material of the horizontal dividers 281, as well as the size and positioning of the apertures 278, may prevent heat transfer across thermal sections 250 while still allowing working gas to pass therethrough.

The gas is expelled from the regenerator 150 via outlet 262 to a cold chamber, for example. As such, the outlet 262 may be referred to as a cold chamber outlet 262. When a working gas, such as helium, hydrogen, etc., is directed through the first side 247a of the regenerator 150, the gas is cooled down from an entrance temperature (e.g., 600° C.) in the inlet 259 to an exit temperature (e.g., 80° C.) dispelled from the outlet 262, where the exit temperature is less than the entrance temperature. Again, the regenerator 150 does not output the heat to other components of the heat pump 100. Instead, the regenerator 150 stores the heat by transferring the heat from the first side 247a to the second side 247b, as will be further described.

Thereafter, it is understood that working gas may be routed to the regenerator 150 via another inlet 265 from a cold chamber of the heat pump 100 or like apparatus, where the inlet 265 may be referred to as a cold chamber inlet 265. As the working gas is cold, the working gas from the cold chamber collects heat stored in the tenth thermal section 250j and moves in vertically between the bottom surface and the top surface of the regenerator 150, collecting additional heat and raising a temperature of the working gas in the adjacent sections, namely, eighth thermal section 250h, sixth thermal section 250f, fourth thermal section 250d, second thermal section 250b, and so forth, via apertures 278. Again, it is understood that the divider 272 prevents the working gas from moving from one thermal section 250 to another while sufficiently maintaining a temperature gradient in a respective thermal section 250.

The working gas is then expelled from the regenerator 150 via outlet 268 to the hot chamber of the heat pump 100, for example. As such, the outlet 268 may be referred to as a hot chamber outlet 268. Accordingly, when a working gas, such as helium, hydrogen, etc., is directed through the second side 247b of the regenerator 150, the gas is heated from an entrance temperature (e.g., 80° C.) in the inlet 265 to an exit temperature (e.g., 600° C.) dispelled from the outlet 268, where the exit temperature is greater than the entrance temperature. Again, the regenerator 150 does not output the heat to other components of the heat pump 100.

The hot chamber inlet 259, the cold chamber outlet 262, the cold chamber inlet 265, the hot chamber outlet 268, as well as other inlets and outlet, may be unidirectional outlets, meaning gas transfers through the respective inlet or outlet in a single direction. As such, no reverse flow of working gas is permitted. To this end, the inlets and/or outlets may utilize one-way valves and the like. The inlet 259 may be described as being positioned in and thermally coupled to the first thermal section 250a, the outlet 262 may be described as being positioned in and thermally coupled to the ninth thermal section 250i, the inlet 265 may be described as being positioned in and thermally coupled to the tenth thermal section 250k, and the outlet 268 may be described as being positioned in and thermally coupled to the second thermal section 250b.

In some embodiments, each of the thermal sections 250 are formed of a porous medium that effectively captures heat from the working gas. Some non-limiting examples of porous mediums include conductive wire mesh (e.g., stainless steel or copper mesh material) and conductive open cell porous mediums. As there may be a significant temperature gradient, the regenerator 150 may have a layered structure made up of the thermal sections 250 with a thin insulator section 256 therebetween, where each thermal section 250 is configured to store heat at a specific temperature range.

With respect to the first side 247a, a working gas may move downwards due to a pressure difference while cooling down from an entrance temperature to an exit temperature. With respect to the second side 247b, a working gas may move upwards due to a pressure difference while heating up from an entrance temperature to an exit temperature. The regenerator 150 permits nearly all the working gas to proceed through isothermal expansion, regenerative cooling, isothermal contraction, and regenerative heating cycles. The volumetric efficiency may be 100% if leakage is negligible. The high volumetric efficiency is a significant advantage over reciprocating mechanisms. Additionally, the mixture of hot and cold working gases inside a regenerator 150 in a reciprocating mechanism may result in significant energy losses, and reduces power density (e.g., capacity per unit machine size). The regenerator 150 further include a top surface 284 and a bottom surface 287 where the thermal sections 250 are stacked between the top surface 284 and the bottom surface 287. The divider 272 extends vertically between the top surface 284 and the bottom surface 287. In some embodiments, the regenerator 150 may include diffusion chambers 290a, 290b, which may include an empty space around inlets and outlets to allow the working gas to distribute uniformly before moving through the regenerator 150.

An outer housing or shell of the various embodiments for a regenerator 150 described, as will as top, side, and bottom containment portions thereof may be made from thermally insulated material to limit the heat loss radially, axially, and so forth. The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

The various embodiments described herein as well as features thereof, such as the regenerator 150 of FIGS. 2-8, the regenerator 150 of FIGS. 10-11, and the regenerator 150 of FIGS. 12-16 may be combined with each other so long as there is no conflict. Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included. The terms "about" and "substantially," unless otherwise defined herein to be associated with a particular range, percentage, or related metric of deviation, account for at least some manufacturing tolerances between a theoretical design and manufactured product or assembly, such as the geometric dimensioning and tolerancing criteria described in the American Society of Mechanical Engineers (ASME®) Y14.5 and the related International Organization for Standardization (ISO®) standards. Such manufacturing tolerances are still contemplated, as one of ordinary skill in the art would appreciate, although "about," "substantially," or related terms are not expressly referenced, even in connection with the use of theoretical terms, such as the geometric "perpendicular," "orthogonal," "vertex," "collinear," "coplanar," and other terms.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable. Further, if a component is described as there being "at least one" of said component, it is understood that this may mean "one or more" of said component. Conversely, if a component is described as there being "one or more" of said component, it is understood that this may mean "at least one" of said component.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A thermally communicating regenerator for adjusting temperature of gas or fluid flowing therethrough in at least one of a unidirectional or bi-directional manner, comprising:
 a housing having a first side configured to cool a working gas or fluid and a second side to heat a working gas or fluid as the working gas or fluid is directed in a vertical direction, the second side being opposite that of the first side;
 a first plurality of thermal portions stacked vertically on the first side extending from a bottom of the housing to a top of the housing; and
 a second plurality of thermal portions stacked vertically on the second side extending from the bottom of the housing to the top of the housing;
 wherein at least one of a first thermal portion in the first plurality of thermal portions or a second thermal portion in the second plurality of thermal portions is formed of conductive porous material, wherein the first thermal portion is thermally coupled to the second thermal portion via a first set of thermal coupling members that transfer heat from the first thermal portion to the second thermal portion.

2. The thermally communicating regenerator of claim 1, wherein the conductive porous material comprises at least one of a conductive wire mesh, a stainless steel mesh, a copper mesh, a conductive open cell porous material, a fiber material, a pellet material, or a fragment material.

3. The thermally communicating regenerator of claim 1, wherein a porosity of the conductive porous material is between 10% and 90%.

4. The thermally communicating regenerator of claim 1, wherein the first set of elongated conductive members are disposed in the conductive porous material of at least one of the first thermal portion or the second thermal portion.

5. The thermally communicating regenerator of claim 1, wherein the first set of elongated conductive members comprise at least one of elongated member formed of a conductive material, a heat pipe, or a copper rod.

6. The thermally communicating regenerator of claim 1, wherein each of the first plurality of thermal portions comprises a different conductive porous material having a different porosity configured to store heat at a different temperature range to cool the working gas or fluid as the working gas or fluid is directed through the first plurality of thermal portions in the first side of the housing.

7. The thermally communicating regenerator of claim 1, wherein each of the second plurality of thermal portions comprises a different conductive porous material having a different porosity configured to store heat at a different temperature range to heat the working gas or fluid as the working gas or fluid is directed through the second plurality of thermal portions in the second side of the housing.

8. The thermally communicating regenerator of claim 1, further comprising:
 a vertical divider positioned vertically within the housing between the first thermal portion and the second thermal portion.

9. The thermally communicating regenerator of claim 8, wherein the vertical divider extends vertically between the bottom and the top of the housing to at least partly define the first side and the second side of the housing.

10. The thermally communicating regenerator of claim 8, wherein:
 the vertical divider comprises apertures having dimensions similar to diameters of the first set of elongated conductive members; and
 the first set of elongated conductive members extend horizontally through the apertures of the vertical divider from the first thermal portion to the second thermal portion.

11. The thermally communicating regenerator of claim 8, wherein the vertical divider comprises at least one of a thermally insulative material, a ceramic material, a plastic material, or a fiber glass material.

12. The thermally communicating regenerator of claim 1, further comprising:
a horizontal divider positioned horizontally between vertically-stacked thermal portions in at least one of the first plurality of thermal portions on the first side of the housing or the second plurality of thermal portions on the second side of the housing.

13. The thermally communicating regenerator of claim 12, wherein the horizontal divider comprises apertures that at least partly define a flow path between the vertically-stacked thermal portions in at least one of the first plurality of thermal portions on the first side of the housing or the second plurality of thermal portions on the second side of the housing.

14. The thermally communicating regenerator of claim 12, wherein the horizontal divider comprises at least one of a thermally insulative material, a ceramic material, a plastic material, or a fiber glass material.

15. The thermally communicating regenerator of claim 1, wherein:
the first plurality of thermal portions further comprises a third thermal portion stacked vertically on the first side of the housing;
the second plurality of thermal portions further comprises a fourth thermal portion stacked vertically on the second side of the housing; and
the third thermal portion is thermally coupled to the fourth thermal portion via a second set of elongated conductive members that transfer heat from the third thermal portion to the fourth thermal portion.

16. The thermally communicating regenerator of claim 15, further comprising:
a first horizontal divider positioned horizontally between the first thermal portion and the third thermal portion on the first side of the housing; and
a second horizontal divider positioned horizontally between the second thermal portion and the fourth thermal portion on the second side of the housing.

17. The thermally communicating regenerator of claim 16, wherein:
the first horizontal divider comprises apertures that at least partly define a flow path between the first thermal portion and the third thermal portion on the first side of the housing; and
the second horizontal divider comprises apertures that at least partly define a flow path between the second thermal portion and the fourth thermal portion on the second side of the housing.

18. The thermally communicating regenerator of claim 16, wherein at least one of the first horizontal divider or the second horizontal divider comprises at least one of a thermally insulative material, a ceramic material, a plastic material, or a fiber glass material.

19. The thermally communicating regenerator of claim 1, further comprising:
a first inlet and a first outlet thermally coupled to the first side of the housing and the first plurality of thermal portions; and
a second inlet and a second outlet thermally coupled to the second side of the housing and the second plurality of thermal portions.

20. The thermally communicating regenerator of claim 19, wherein each of the first inlet, the first outlet, the second inlet and the second outlet is unidirectional.

\* \* \* \* \*